United States Patent
Morimoto et al.

(10) Patent No.: US 8,329,322 B2
(45) Date of Patent: Dec. 11, 2012

(54) ELECTRODE-MEMBRANE-FRAME ASSEMBLY FOR POLYELECTROLYTE FUEL CELL, MANUFACTURING METHOD THEREFOR, AND POLYELECTROLYTE FUEL CELL

(75) Inventors: Takashi Morimoto, Osaka (JP); Hiroki Kusakabe, Osaka (JP); Toshihiro Matsumoto, Osaka (JP); Norihiko Kawabata, Osaka (JP); Mitsuo Yoshimura, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/443,730

(22) PCT Filed: Oct. 10, 2008

(86) PCT No.: PCT/JP2008/002869
§ 371 (c)(1),
(2), (4) Date: Mar. 31, 2009

(87) PCT Pub. No.: WO2009/047908
PCT Pub. Date: Apr. 16, 2009

(65) Prior Publication Data
US 2010/0098989 A1    Apr. 22, 2010

(30) Foreign Application Priority Data
Oct. 12, 2007    (JP) ................. 2007-266566

(51) Int. Cl.
*H01M 8/04* (2006.01)
*H01M 2/14* (2006.01)

(52) U.S. Cl. .......... 429/30; 429/463; 429/465; 429/507; 429/508; 429/511; 156/245

(58) Field of Classification Search ........................ None
See application file for complete search history.

(56) References Cited

U.S. PATENT DOCUMENTS
4,753,857 A  *  6/1988  Hosaka ........................... 429/38
(Continued)

FOREIGN PATENT DOCUMENTS
EP          1 511 103       *   3/2005
(Continued)

OTHER PUBLICATIONS

Supplemental European Search Report issued Sep. 10, 2009 in European Application 08 83 2778, which is a counterpart to the present application.
(Continued)

*Primary Examiner* — Ula C. Ruddock
*Assistant Examiner* — Alix Echelmeyer
(74) *Attorney, Agent, or Firm* — Wenderoth, Lind & Ponack, L.L.P.

(57) ABSTRACT

In a solid polyelectrolyte fuel cell, with a frame including a frame body main part placed along a peripheral edge portion of a membrane, a plurality of first retaining portions which are arrayed so as to protrude from an inner edge of the frame body main part and which retain the front surface side of the membrane, and a plurality of second retaining portions which are arrayed so as to protrude from the inner edge of the frame body main part and which retain the back surface side of the membrane, the first retaining portions and the second retaining portions are so arrayed that retaining positions of the membrane by the first retaining portions and retaining positions of the membrane by the second retaining portions are alternately placed. A plurality of front-surface side elastic members are placed on the front surface of the membrane between neighboring ones of the first retaining portions while a plurality of back-surface side elastic members are placed on the back surface of the membrane between neighboring ones of the second retaining portions.

9 Claims, 25 Drawing Sheets

U.S. PATENT DOCUMENTS

| | | | |
|---|---|---|---|
| 6,057,054 A * | 5/2000 | Barton et al. | 429/42 |
| 6,667,124 B2 | 12/2003 | Suenaga et al. | |
| 6,716,550 B1 | 4/2004 | Kirby | |
| 7,276,310 B2 | 10/2007 | Kobayashi et al. | |
| 2007/0003810 A1 * | 1/2007 | Heystek et al. | 429/35 |
| 2007/0264557 A1 | 11/2007 | Kobayashi et al. | |

FOREIGN PATENT DOCUMENTS

| | | |
|---|---|---|
| JP | 2001-015127 | 1/2001 |
| JP | 2002-093434 | 3/2002 |
| JP | 2003-331873 | 11/2003 |
| JP | 2004-047230 | 2/2004 |
| JP | 2004-319461 | 11/2004 |
| JP | 2005-100970 | 4/2005 |
| JP | 2006-004677 | 1/2006 |
| JP | 2007-141792 | 6/2007 |
| WO | 2006/040994 | 4/2006 |

OTHER PUBLICATIONS

International Search Report issued Jan. 13, 2009 in the International (PCT) Application of which the present application is the U.S. National Stage (with partial English translation).

International Preliminary Report on Patentability in International Application No. PCT/JP2008/002869 (of which the present application is the U.S. National Stage) and full English translation issued on May 11, 2010.

English translation of International Search Report issued on Jan. 13, 2009 in International Application No. PCT/JP2008/002869 of which the present application is the U.S. National Stage.

* cited by examiner

ELECTRODE-MEMBRANE-FRAME ASSEMBLY FOR POLYELECTROLYTE FUEL CELL, MANUFACTURING METHOD THEREFOR, AND POLYELECTROLYTE FUEL CELL

BACKGROUND OF THE INVENTION

The present invention relates to solid polyelectrolyte fuel cells and, in particular, to a structure of an electrode-membrane-frame assembly for fuel cells as well as a manufacturing method therefor.

The solid polyelectrolyte fuel cell (hereinafter, occasionally referred to as "PEFC") is a device for concurrently generating electric power and heat by electrochemically reacting a hydrogen-containing fuel gas with an oxygen-containing oxidizer gas such as air.

The most typical solid polyelectrolyte fuel cell comprises a polyelectrolyte membrane supported by a frame body with a gas-sealing gasket provided in a peripheral edge portion of the frame body, a membrane-electrode assembly (MEA) made up with an anode bonded to one surface of the electrolyte membrane and with a cathode bonded to the other surface of the electrolyte membrane, and an anode-side conductive separator plate and a cathode-side conductive separator plate with the MEA sandwiched therebetween. Gas feeding parts for feeding fuel gas and oxidizer gas to the anode and the cathode, respectively, are formed at peripheral edges of central portions of separator plates to be put into contact with the MEA.

A structure of such a conventional solid polyelectrolyte fuel cell is disclosed, for example, in Patent Document 1. Specifically, as shown in FIG. 14, an MEA 303 whose peripheral edge portion is supported inside a frame body 300 is sandwiched by separators 301 is disclosed.

Such an MEA is incorporated at a thicknesswise generally center of the frame body. As a bonding method therefor, adhesive or mechanical clamping or the like is adopted.
Patent Document 1: JP 2005-100970 A
Patent Document 2: WO 2006/040994

However, the bonding method with adhesive for a polyelectrolyte membrane may incur performance deterioration of the polyelectrolyte membrane due to volatile components of the adhesive and so its applicable conditions are limited. Also, the bonding method by mechanical clamp causes a problem that crossleak tends to occur through a minute gap between the polyelectrolyte membrane and the frame body. The crossleak phenomenon refers to a phenomenon that with reference to FIG. 14, part of gas fed into the cell passes through a slight gap generated between an inner edge of the frame body 300 and an electrode 302 so that the gas leaks from one of the anode or cathode side to the other. For improvement of power generating efficiency in fuel cells, there is a need for reducing such crossleaks.

As one method for suppressing occurrence of such a crossleak phenomenon, it is conceivable to form the frame body by injection molding so that the peripheral edge portion of the MEA is placed inside the frame body. Using such a method makes it possible to improve close contactability between the frame body and the peripheral edge portion of the MEA and thereby reduce the crossleak. Such a method is disclosed also in, for example, Patent Document 2.

Specifically, as shown in FIG. 15A, a first frame member 311 preliminarily formed into a frame shape by injection molding or the like is prepared. Then, as shown in FIG. 15B, a peripheral edge portion of an electrode 314 in which anode and cathode are placed on both sides of an electrolyte membrane 313, i.e., a peripheral edge portion 313a of the electrolyte membrane 313 is positioned and set on the first frame member 311. Thereafter, as shown in FIG. 15C, a resin material is injected by injection molding onto the top of the first frame member 311 with the peripheral edge portion 313a of the electrolyte membrane 313 set thereon, by which a second frame member 312 is formed. By forming the second frame member 312 integrally bonded to the first frame member 311 by injection molding as shown above, the peripheral edge portion 313a of the electrolyte membrane 313 sandwiched therebetween can be retained in an even closer contact state.

However, such a formation method by injection molding has the following issues. As shown in FIG. 16A, during the formation of the second frame member 312 by injection molding, when a high-temperature, high-pressure resin material P is injected into a metal mold (not shown), the peripheral edge portion 313a of the electrolyte membrane 313 placed on top of the first frame member 311 may be floated up in the resin material due to flow resistance of the resin material P, resulting in some cases in a state of being peeled up from the top surface of the first frame member 311. If the resin material P is solidified in such a state, the electrode 314 is retained with the peripheral edge portion 313a of the electrolyte membrane 313 completely floated up inside the second frame member 312 as shown in FIG. 16B.

In such a case, it can occur that the electrode 314 cannot be retained enough by the frame body 310 or that the electrolyte membrane 313 may be damaged, so that the crossleak cannot be reduced enough. In particular, the MEA is a comparatively expensive member, and implementation of high yield (productivity) is desired in the manufacture of fuel cells. Further, together with such productivity improvement in the fuel cell manufacture, improvement in performance of fuel cells such as power generating efficiency also has still been being demanded.

Accordingly, a first object of the present invention, lying in solving the above-described issues, is to provide an electrode-membrane-frame assembly for solid polyelectrolyte fuel cells, as well as a manufacturing method for the electrode-membrane-frame assembly and a solid polyelectrolyte fuel cell including the electrode-membrane-frame assembly, the electrode-membrane-frame assembly being capable of effectively suppressing the crossleak phenomenon between the polyelectrolyte membrane and the frame body and allowing high yield to be implemented in its manufacture.

A second object of the invention is to provide an electrode-membrane-frame assembly for fuel cells which allows the performance such as power generating efficiency to be improved in solid polyelectrolyte fuel cells, as well as to provide a manufacturing method for the electrode-membrane-frame assembly and a polyelectrolyte fuel cell including the electrode-membrane-frame assembly.

SUMMARY OF THE INVENTION

In order to achieve the above object, the present invention has the following constitutions.

According to a first aspect of the present invention, there is provided an electrode-membrane-frame assembly for polyelectrolyte fuel cells, comprising:

a membrane-electrode assembly having a polyelectrolyte membrane and a pair of electrode layers placed on portions of both-side surfaces of the polyelectrolyte membrane inner than a peripheral edge portion thereof;

a frame body which retains the peripheral edge portion of the membrane-electrode assembly, the frame body being formed from resin; and elastic members for sealing communications between front-and-back surfaces of the membrane-electrode assembly in the peripheral edge portion of the membrane-electrode assembly, wherein the frame body comprises:
a frame body main part placed along the peripheral edge portion of the polyelectrolyte membrane;
a plurality of first retaining portions which are formed so as to protrude from an inner edge of the frame body main part toward a center of the frame body and to be arrayed along the inner edge and which serve for retaining the front surface side of the polyelectrolyte membrane; and
a plurality of second retaining portions which are formed so as to protrude from the inner edge of the frame body main part toward the center of the frame body and to be arrayed along the inner edge and which serve for retaining the back-surface side of the polyelectrolyte membrane, and wherein the first retaining portions and the second retaining portions are so arrayed that retaining positions of the polyelectrolyte membrane by the first retaining portions and retaining positions of the polyelectrolyte membrane by the second retaining portions are alternately placed along the peripheral edge portion of the polyelectrolyte membrane, and the elastic members include a plurality of front-surface side elastic members placed on the front surface of the polyelectrolyte membrane between neighboring ones of the first retaining portions, and a plurality of back-surface side elastic members placed on the back surface of the polyelectrolyte membrane between neighboring ones of the second retaining portions.

According to a second aspect of the present invention, there is provided the electrode-membrane-frame assembly for polyelectrolyte fuel cells as defined in the first aspect, wherein the front-surface side elastic members and the back-surface side elastic members are each formed so as to be upheaved upper than a separator-side surface of the frame body.

According to a third aspect of the present invention, there is provided the electrode-membrane-frame assembly for polyelectrolyte fuel cells as defined in the first aspect, wherein the front-surface side elastic members and the back-surface side elastic members are placed on the front surface and the back surface, respectively, of the polyelectrolyte membrane so as to extend from the inner edge of the frame body main part to outer edges of the electrode layers, respectively.

According to a fourth aspect of the present invention, there is provided the electrode-membrane-frame assembly for polyelectrolyte fuel cells as defined in the third aspect, wherein neighboring ones of the front-surface side elastic members are so formed as to be coupled to one another, and neighboring ones of the back-surface side elastic members are so formed as to be coupled to one another.

According to a fifth aspect of the present invention, there is provided the electrode-membrane-frame assembly for polyelectrolyte fuel cells as defined in the first aspect, wherein one of the back-surface side elastic members placed opposite to the first retaining portions, and one of the front-surface side elastic members placed opposite to the second retaining portions neighboring the one of the back-surface side elastic members, have an overlap region in part of their respective placement regions onto the polyelectrolyte membrane in the peripheral edge portion of the polyelectrolyte membrane.

According to a sixth aspect of the present invention, there is provided the electrode-membrane-frame assembly for polyelectrolyte fuel cells as defined in the first aspect, wherein the first retaining portions and the second retaining portions are so formed that a width of each of the retaining portions on its projective end side projecting toward the center of the frame body is larger than a width of each of the retaining portions on its frame body main part side.

According to a seventh aspect of the present invention, there is provided the electrode-membrane-frame assembly for polyelectrolyte fuel cells as defined in the first aspect, wherein a space is provided between the inner edge of the frame body main part and an end face of the peripheral edge portion of the polyelectrolyte membrane.

According to an eighth aspect of the present invention, there is provided a polyelectrolyte fuel cell which comprises, in one layer or a plurality of stacked layers, an electric cell module having the electrode-membrane-frame assembly as defined in any one of the first to seventh aspects, and a pair of separators which are so placed as to sandwich the electrode-membrane-frame assembly.

According to a ninth aspect of the present invention, there is provided a method for manufacturing an electrode-membrane-frame assembly for polyelectrolyte fuel cells, comprising:

in such an arrangement of a membrane-electrode assembly in a mold for injection molding that the membrane-electrode assembly is supported from its front surface side by a plurality of first support portions placed along a peripheral edge portion of the membrane-electrode assembly while the membrane-electrode assembly is supported from its back surface side by a plurality of second support portions which are placed along the peripheral edge portion of the membrane-electrode assembly so as to be alternately positioned with the plurality of first support portions along the peripheral edge portion, forming a frame-shaped flow passage placed in a frame shape along the peripheral edge portion of the membrane-electrode assembly, a first flow passage which is communicated with the frame-shaped flow passage and which is placed so as to be in contact with a front surface in the peripheral edge portion of the membrane-electrode assembly between neighboring ones of the first support portions, and a second flow passage which is communicated with the frame-shaped flow passage and which is placed so as to be in contact with a back surface in the peripheral edge portion of the membrane-electrode assembly between neighboring ones of the second support portions;

injecting and filling resin into the flow passages in a state that the peripheral edge portion of the membrane-electrode assembly is retained by the first support portions and the second support portions, respectively;

solidifying the filled resin thereby forming a frame body including: a frame body main part formed by the frame-shaped flow passage; a plurality of first retaining portions which are arrayed along an inner edge of the frame body main part in the first flow passage so as to protrude from the inner edge toward a center of the frame body and which serve for retaining the front-surface side of the membrane-electrode assembly; and a plurality of second retaining portions which are arrayed along the inner edge of the frame body main part in the second flow passage so as to protrude from the inner edge toward the center of the frame body and which serve for retaining the back-surface side of the membrane-electrode assembly; and forming a plurality of front-surface side elastic members which are placed on the front surface of the membrane-electrode assembly between neighboring ones of the first retaining portions, and a plurality of back-surface side elastic members which are placed on the back surface of the membrane-electrode assembly between neighboring ones of the second retaining portions.

According to the present invention, in a structure that a peripheral edge portion of a polyelectrolyte membrane in a membrane-electrode assembly is retained by a frame body formed from resin material, the frame body comprises a plurality of first retaining portions which protrude from an inner edge of a frame body main part toward a center of the frame body and which are arrayed along the inner edge to retain the front surface side of the polyelectrolyte membrane, and a plurality of second retaining portions which are similar in structure to the first retaining portions and which retain the back surface side of the polyelectrolyte membrane. Further in the frame body, the first retaining portions and the second retaining portions are so formed that retaining positions of the polyelectrolyte membrane by the first retaining portions and retaining positions of the polyelectrolyte membrane by the second retaining portions are alternately placed along the peripheral edge portion of the polyelectrolyte membrane. With such a structure adopted, in the formation of the frame body by injection molding with resin, it becomes possible to carry out the injection of resin for the formation of the frame body in the state that the polyelectrolyte membrane is securely retained from its front-and-back surfaces by the mold between the respective retaining portions alternately positioned on the front and back surface sides of the polyelectrolyte membrane. Accordingly, such failures as floating-up of the polyelectrolyte membrane can be prevented during the injection molding process, so that the crossleak phenomenon can be suppressed effectively. Furthermore, such formation of the frame body by injection molding becomes implementable in one step, so that the productivity for the formation can be improved.

Also, with the placement that elastic members higher in elasticity than the frame body are placed on front and back surfaces of the polyelectrolyte membrane between the individual retaining portions alternately positioned on the front and back surfaces of the polyelectrolyte membrane as shown above, it becomes possible to ensure portions of sealing between the frame body and the polyelectrolyte membrane by the contact of the elastic members with the surfaces of the polyelectrolyte membrane, so that the sealing effect between the frame body and the polyelectrolyte membrane can be enhanced and the occurrence of the crossleak phenomenon can be suppressed even more effectively. Further, the placement of such elastic members between the individual retaining portions allows the distance between ends of the retaining portions and the outer edge of the electrode layer to be reduced. Therefore, while the frame body is made compact in outer dimensions, an area of the electrode layer that contributes to power generation process can be ensured efficiently, so that the power generating efficiency of the fuel cell can be improved.

BRIEF DESCRIPTION OF DRAWINGS

These aspects and features of the present invention will become clear from the following description taken in conjunction with the preferred embodiments thereof with reference to the accompanying drawings, in which.

DETAILED DISCUSSION OF THE INVENTION

Figure 1:
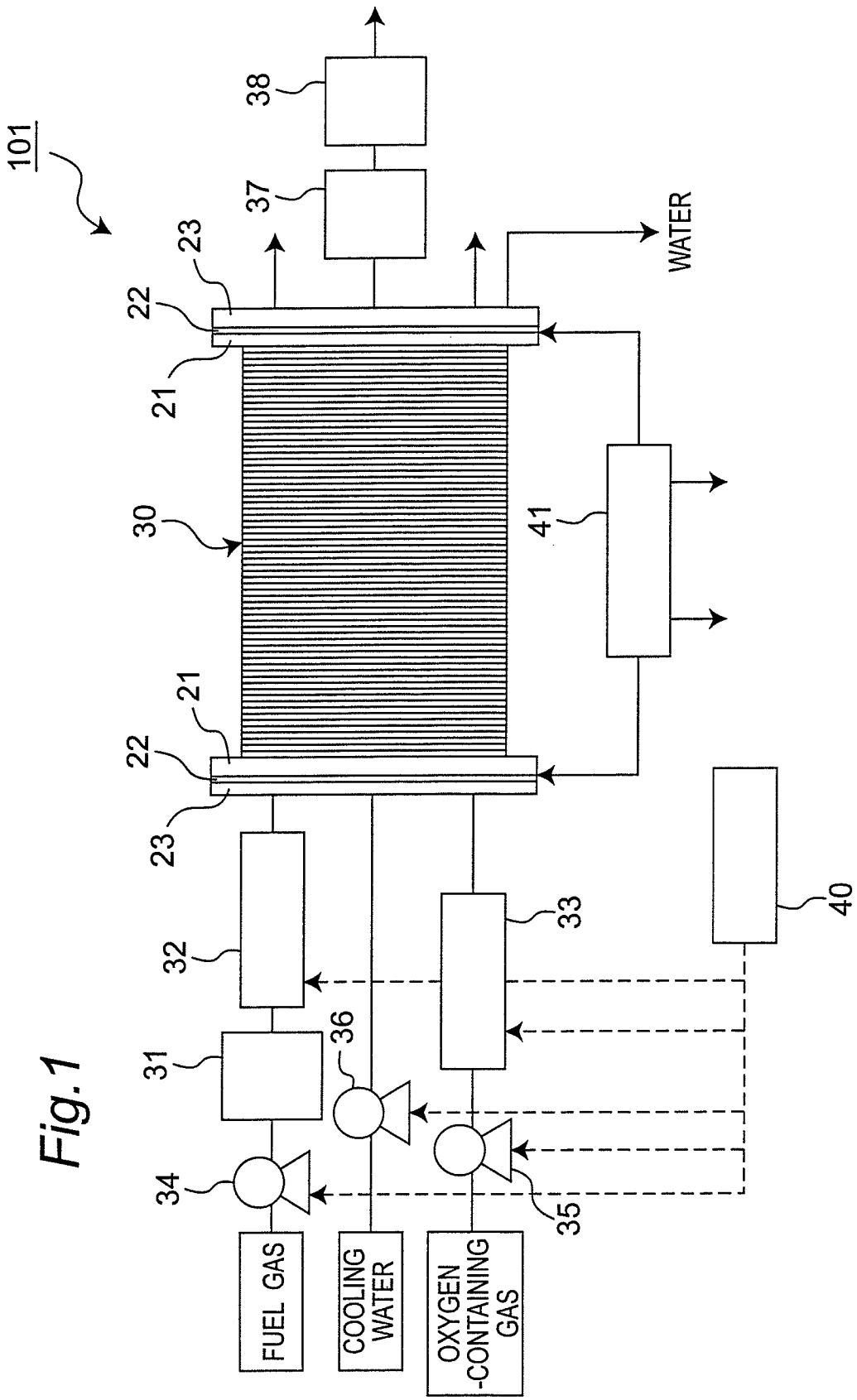
FIG. 1 is a schematic structural view showing an outlined structure of a fuel cell according to a first embodiment of the invention.

Before the description of the present invention proceeds, it is to be noted that like parts are designated by like reference numerals throughout the accompanying drawings.

Hereinbelow, embodiments of the present invention will be described in detail with reference to the accompanying drawings.

First Embodiment

Figure 2:
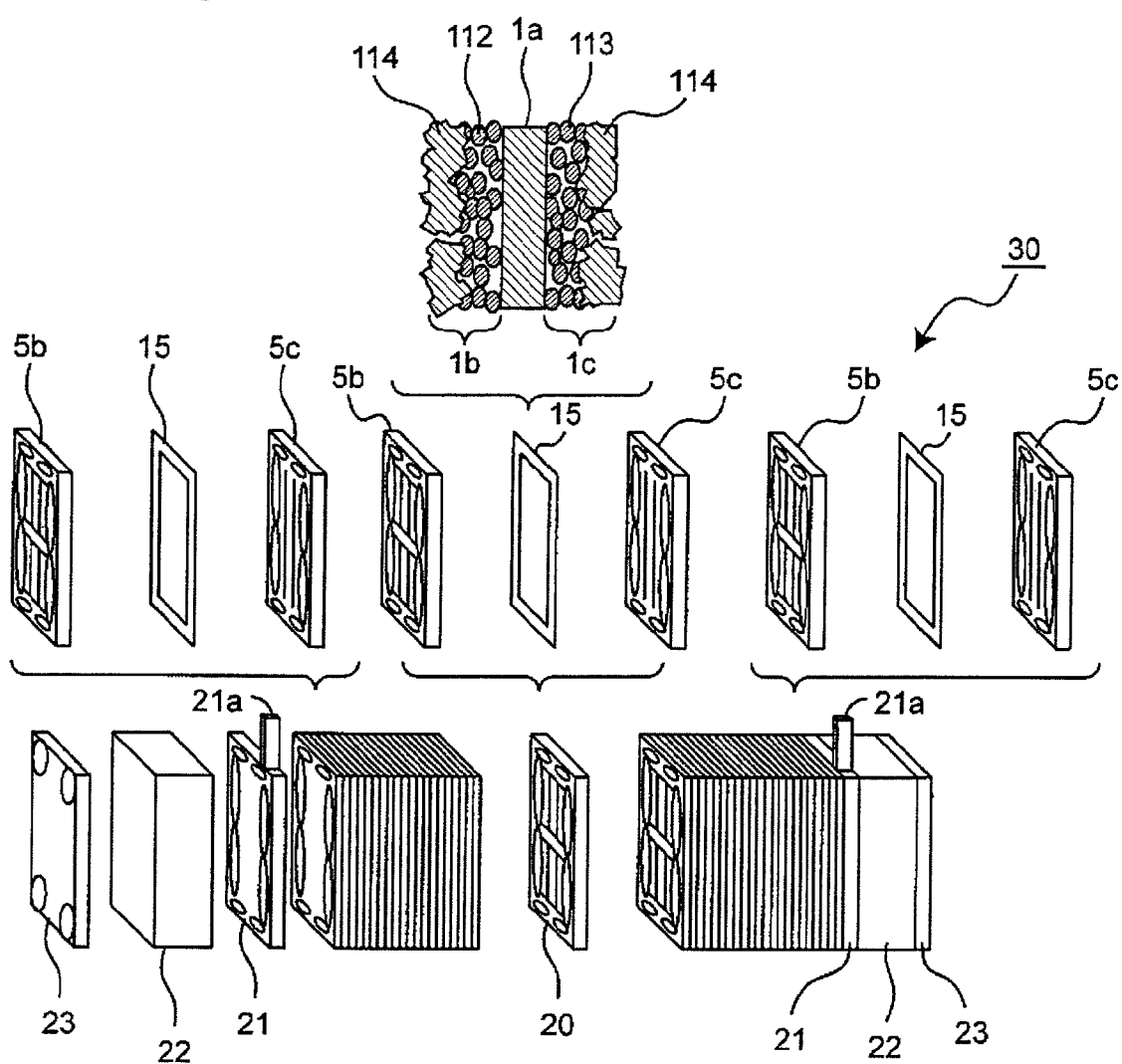
FIG. 2 is a schematic exploded view of the fuel cell stack included in the fuel cell of FIG. 1.

FIG. 1 shows a schematic structural view showing an outlined structure of a polyelectrolyte fuel cell (PEFC) including a fuel cell stack according to a first embodiment of the invention. FIG. 2 shows a schematic exploded view of the fuel cell stack (hereinafter, referred to as stack) included in the fuel cell 101 shown in FIG. 1.

The fuel cell 101 acts to make a hydrogen-containing fuel gas and an oxygen-containing oxidizer gas such as air as an example electrochemically react with each other to produce electric power, heat and water concurrently. As shown in FIG. 1, the fuel cell 101 includes: a stack 30 having a stacked multilayer structure in which a plurality of fuel cells (or unit cells or electric cell module) having an anode-and-cathode pair of electrodes are connected in series; a fuel processor 31 for extracting hydrogen from the fuel gas; an anode humidifier for humidifying the hydrogen-containing fuel gas extracted by the fuel processor 31 to improve the power generating efficiency; a cathode humidifier 33 for humidifying the oxygen-containing gas (oxidizer gas); and pumps 34, 35 for feeding the fuel gas and the oxygen-containing gas, respectively. That is, the fuel processor 31, the anode humidifier 32 and the pump 34 constitute a fuel feeder unit for feeding the fuel gas to the individual cells of the stack 30, while the cathode humidifier 33 and the pump 35 constitute an oxidizer feeder unit for feeding the oxidizer gas to the individual cells of the stack 30. Although the fuel feeder unit and the oxidizer feeder unit may be provided in various forms other than shown above as far as they have the function of feeding fuel and oxidizer, feeder units that feed fuel or oxidizer in common to a plurality of cells included in the stack 30 may be adopted in this embodiment enough to favorably obtain later-described advantageous effects of the embodiment.

The fuel cell 101 also includes: a pump 36 for feeding and circulating cooling water to efficiently remove heat generated in the stack 30 during the power generation; a heat exchanger 37 for exchanging the heat removed by the cooling water (e.g., a liquid having no electroconductivity such as pure water) with tap water or other fluid; and a hot water storage tank 38 for storing heat-exchanged tap water. Furthermore, the fuel cell 101 includes an operation control unit 40 that performs operation control for power generation by associating such individual constituent sections with one another, and an electricity output section 41 that extracts electricity generated by the stack 30.

As shown in FIG. 2, the stack 30 included in the fuel cell 101 is formed by stacking a plurality of unit cells (electric cell module) 20, which are fundamental unit components, into multiple layers and by tightening the stacked layers with current collector plates 21, insulating plates 22 and end plates 23 from both sides with a specified load. Each of the current collector plates 21 is provided with a current-extracting terminal portion 21a, from which a current, i.e. electricity, is extracted during power generation. Each of the insulating plates 22, which insulates the current collector plate 21 and the end plate 23 from each other, may be provided with unshown inlet and outlet for gas or cooling water. The end plates 23 tighten and retain the stacked multilayered unit cells 20, the current collector plates 21 and the insulating plates 22 with a specified load by an unshown pressure means.

As shown in FIG. 2, each unit cell 20 is so formed that the MEA (membrane-electrode assembly) 15 is sandwiched by a pair of separators 5b, 5c. The MEA 15 is so formed that a catalytic layer (anode-side catalytic layer) 112 composed mainly of carbon powder carrying a platinum-ruthenium alloy catalyst is formed on an anode surface side of a polyelectrolyte membrane 1a, which is an example of the polyelectrolyte membrane member for selectively transporting hydrogen ions, while a catalytic layer (cathode-side catalytic layer) 113 composed mainly of carbon powder carrying a platinum catalyst is formed on its cathode surface side, where gas diffusion layers 114 having both gas permeability for fuel gas or oxidizer gas and electronic conductivity are set on outer sides of those catalytic layers 112 and 113. As the polyelectrolyte membrane 1a, a solid polymer material showing proton conductivity, for example, perfluorosulfonic acid membrane (Nafion membrane made by DuPont) is generally used. Hereinbelow, the anode-side catalytic layer 112 and the gas diffusion layers 114 together will be referred to as anode electrode (anode electrode layer) 1b, and the cathode-side catalytic layer 113 and the gas diffusion layers 114 together will be referred to as cathode electrode (cathode electrode layer) 1c.

The separators 5b, 5c have only to be made of a gas-impermeable electroconductive material and are generally formed, for example, by using a resin-impregnated carbon material cut into a specified configuration or a molded product of a carbon powder and resin material mixture. At portions of the separators 5b, 5c to be in contact with the MEA 15 are formed recessed groove portions, and these groove portions are put into contact with the gas diffusion layers 114 to form gas flow passages for feeding the fuel gas or the oxidizer gas to the electrode surfaces and carrying away excess gas. The gas diffusion layers 114 may be formed generally by using carbon fiber as their base material, and carbon fiber woven cloth as an example is usable as such a base material.

Figure 3:
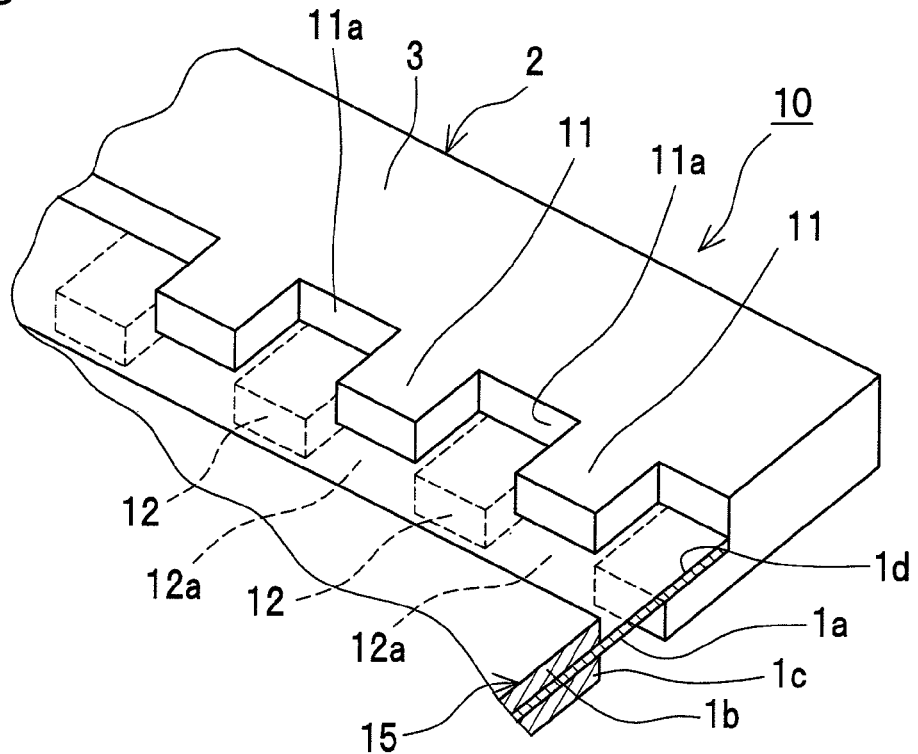
FIG. 3 is a partial schematic view (with no elastic members) of the electrode-membrane-frame assembly included in the fuel cell stack of FIG. 2.

In this connection, a schematic partial perspective view of near an end portion of the MEA 15 in the unit cell 20 is shown under magnification in FIG. 3.

As shown in FIG. 3, the MEA 15 is so formed that the anode electrode 1b is bonded to one surface of the polyelectrolyte membrane 1a while the cathode electrode 1c is bonded to the other surface of the polyelectrolyte membrane 1a. The polyelectrolyte membrane 1a is formed overall larger than the anode electrode 1b and the cathode electrode 1c so that a peripheral edge portion 1d of the polyelectrolyte membrane 1a is exposed from between the anode electrode 1b and the cathode electrode 1c. The peripheral edge portion 1d of the polyelectrolyte membrane 1a of the MEA 15 is retained by a frame body 2 formed from thermoplastic resin. Thus, an integrated structure in which the MEA 15 is retained by the frame body 2 forms an electrode-membrane-frame assembly 10.

As shown in FIG. 3, the frame body 2 includes: a frame body main part 3 placed along the peripheral edge portion 1d of the polyelectrolyte membrane 1a; a plurality of first retaining portions 11 which are formed so as to protrude from an inner edge of the frame body main part 3 toward a center of the frame body (i.e., toward a center of the MEA 15) and to be arrayed along the inner edge and which serve for retaining the anode side (i.e., front surface side in the figure) of the polyelectrolyte membrane 1a; and a plurality of second retaining portions 12 which are formed so as to protrude from the inner edge of the frame body main part 3 toward the center of the frame body (i.e., toward the center of the MEA 15) and to be arrayed along the inner edge and which serve for retaining the cathode side (i.e., back surface side in the figure) of the polyelectrolyte membrane 1a. The first retaining portions 11 and the second retaining portions 12 are formed so that retaining positions of the polyelectrolyte membrane 1a by the first retaining portions 11 and retaining positions of the polyelectrolyte membrane 1a by the second retaining portions 12 are alternately placed along the peripheral edge portion 1d of the polyelectrolyte membrane 1a. That is, on the cathode side in the inner edge of the frame body main part 3 is formed a protruding-and-recessed structure in which the first retaining portions 11 that are generally rectangular-shaped protruding portions are formed at a constant interval pitch as an example so as to continuously range along the inner edge. Similarly, on the anode side in the inner edge of the frame body main part 3 is formed a protruding-and-recessed structure in which the second retaining portions 12 that are generally rectangular-shaped protruding portions are formed at the same interval pitch as the above-described constant interval pitch as an example so as to continuously range along the inner edge. The protruding-and-recessed structure by the first retaining portions 11 and the protruding-and-recessed structure by the second retaining portions 12 are placed so that their protrusions and recesses are alternately positioned between anode and cathode side. That is, positions at which first recessed portions 11a between neighboring first retaining portions 11 are formed and positions at which the second retaining portions 12 are formed are so placed as to be opposed to each other with the peripheral edge portion 1d of the polyelectrolyte membrane 1a interposed therebetween. Similarly, positions at which second recessed portions 12a between neighboring second retaining portions 12 are formed and positions at which the first retaining portions 11 are formed are so placed as to be opposed to each other with the peripheral edge portion 1d of the polyelectrolyte membrane 1a interposed therebetween. In addition, the end portion of the peripheral edge portion 1d of the polyelectrolyte membrane 1a is held placed between the individual first retaining portions 11 and the individual second retaining portions 12 so as to be in contact with the inner edge of the frame body main part 3.

Figure 4:
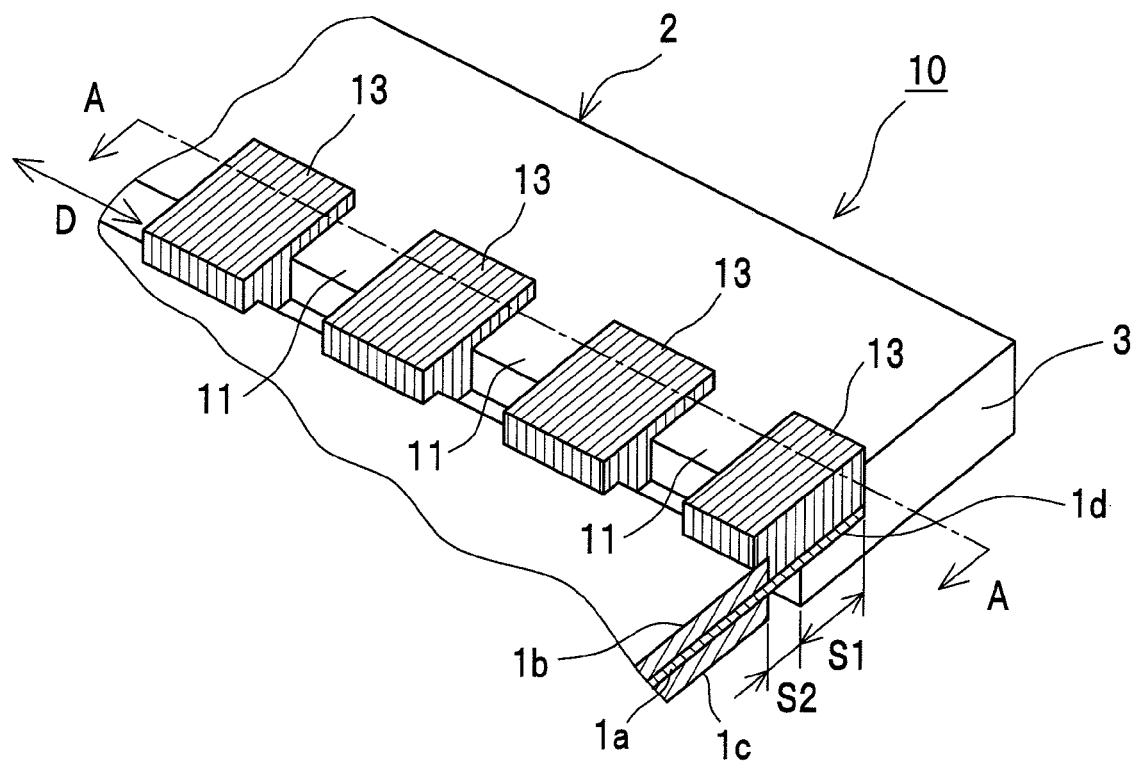
FIG. 4 is a partial schematic view (with elastic members) of the electrode-membrane-frame assembly included in the fuel cell stack of FIG. 2.

Next, FIG. 4 shows a partial schematic perspective view of a state of the electrode-membrane-frame assembly 10 having such a structure as described above in which elastic members for suppressing occurrence of the crossleak phenomenon are further included therein.

As shown in FIG. 4, on the polyelectrolyte membrane 1a in the first recessed portions 11a of the frame body 2, anode-side elastic members (front-surface side elastic members) 13 formed from elastic material are placed so as to fill inner spaces of the first recessed portions 11a, respectively. Also, on the polyelectrolyte membrane 1a in the second recessed portions 12a, cathode-side elastic members (back-surface side elastic members) 14 formed from elastic material are placed, respectively, so as to fill inner spaces of the second recessed portions 12a (see FIG. 5A). The individual anode-side elastic members 13 are placed so as to fill the inner spaces of the first recessed portions 11a and moreover extend toward the center of the frame body on the polyelectrolyte membrane 1a and to cover an outer-edge end face of the anode electrode 1b. Although not shown in FIG. 4, the individual cathode-side elastic members 14 are placed so as to fill the inner spaces of the second recessed portions 12a and moreover extend toward the center of the frame body on the polyelectrolyte membrane 1a and to cover an outer-edge end face of the cathode electrode 1c. Further, the anode-side elastic members 13 are formed each into a generally rectangular-parallelopiped shape with their flat top surfaces upheaved upper than the top surfaces of the first retaining portions 11. Similarly, the cathode-side elastic members 14 are also formed so that their top surfaces (bottom surfaces in FIG. 4) are upheaved over the second retaining portions 12.

Figure 5A:
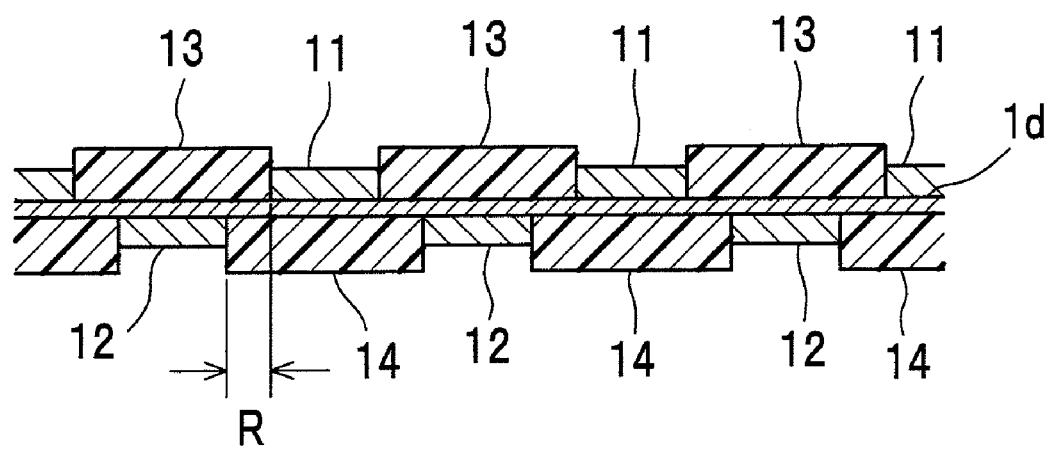
FIG. 5A is a schematic sectional view of the electrode-membrane-frame assembly taken along the line A-A of FIG. 4.

In this connection, FIG. 5A shows a sectional view of the electrode-membrane-frame assembly 10 taken along the line A-A of FIG. 4. As shown in FIG. 5A, the first retaining portions 11 and the second retaining portions 12 are alternately arrayed with the polyelectrolyte membrane 1a interposed therebetween, and similarly the anode-side elastic members 13 and the cathode-side elastic members 14 are alternately arrayed with the polyelectrolyte membrane 1a interposed therebetween. Further, as shown in FIG. 5A, one cathode-side elastic member 14 placed opposite to the first retaining portion 11 and one anode-side elastic member 13 placed opposite to the second retaining portion 12 adjacent to the one cathode-side elastic member 14 have an overlap region R in part of their placement regions on the polyelectrolyte membrane 1a. That is, the elastic members 13 and the elastic members 14 are placed on the front-and-back surfaces of the polyelectrolyte membrane 1a so that placement regions of the elastic members 13, 14 partly overlap with each other along the peripheral edge portion 1d of the polyelectrolyte membrane 1a.

Figure 5B:
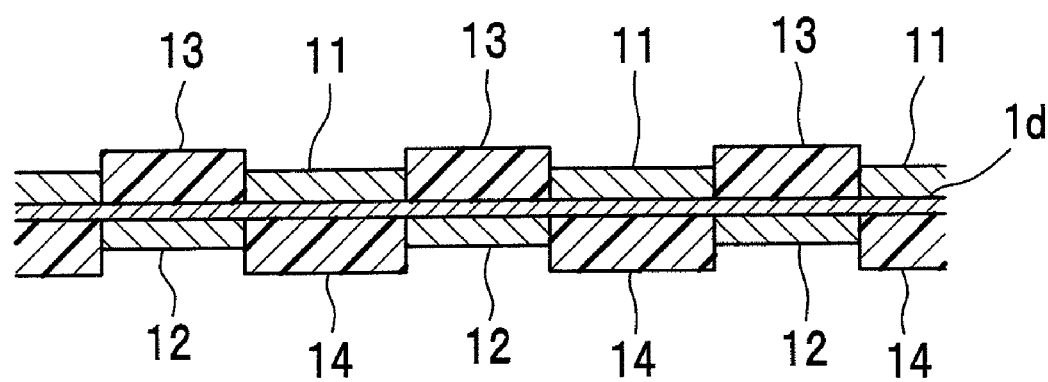
FIG. 5B is a schematic sectional view of an electrode-membrane-frame assembly according to a modification taken along the line A-A of FIG. 4.

This first embodiment is described on a case where overlap regions R are generated in part of the placement regions of the anode-side elastic members 13 and the cathode-side elastic members 14, as shown in FIG. 5A. However, this embodiment is not limited to such a case only. Instead, for example as shown in the schematic sectional view of FIG. 5B, it is also possible that end-portion positions of the anode-side elastic members 13 and end-portion positions of the cathode-side elastic members 14 are placed coincident with each other without the overlap regions R in the placement regions of the elastic members 13, 14.

With such a placement of the elastic members 13, adopted, communications between the front-and-back surfaces of the polyelectrolyte membrane 1a in the peripheral edge portion 1d of the polyelectrolyte membrane 1a can be sealed from each other along the peripheral edge portion 1d of the polyelectrolyte membrane 1a by the elastic members 13 to 14 at either one side of the front-and-back surfaces, so that the occurrence of the crossleak phenomenon can be suppressed effectively. In particular, by the formation of the overlap regions R in the placement regions of the elastic members 13, 14 as shown in FIG. 5A, even if positional shifts in the placement positions of the elastic members 13, 14 are generated during the manufacture process, the positional shifts can be absorbed by the overlap regions R so that occurrence of non-sealed places due to effects of the positional shifts can be prevented and a more reliable sealing can be achieved.

The material of the frame body 2, i.e., the frame body main part 3, the first retaining portions 11 and the second retaining portions 12 is specifically exemplified by R-250G or 350G made by Prime Polymer Co., Ltd., and the material of the separators is specifically exemplified by resin-impregnated graphite plate (Glassy Carbon made by Tokai Carbon Co., Ltd.) with outer dimensions of 120 mm×120 mm and a thickness of 3.0 mm.

Next, a method for forming the electrode-membrane-frame assembly 10 having such a constitution as described above by injection molding is described with reference to schematic explanatory views shown in FIGS. 6A to 6E.

Figure 6A:
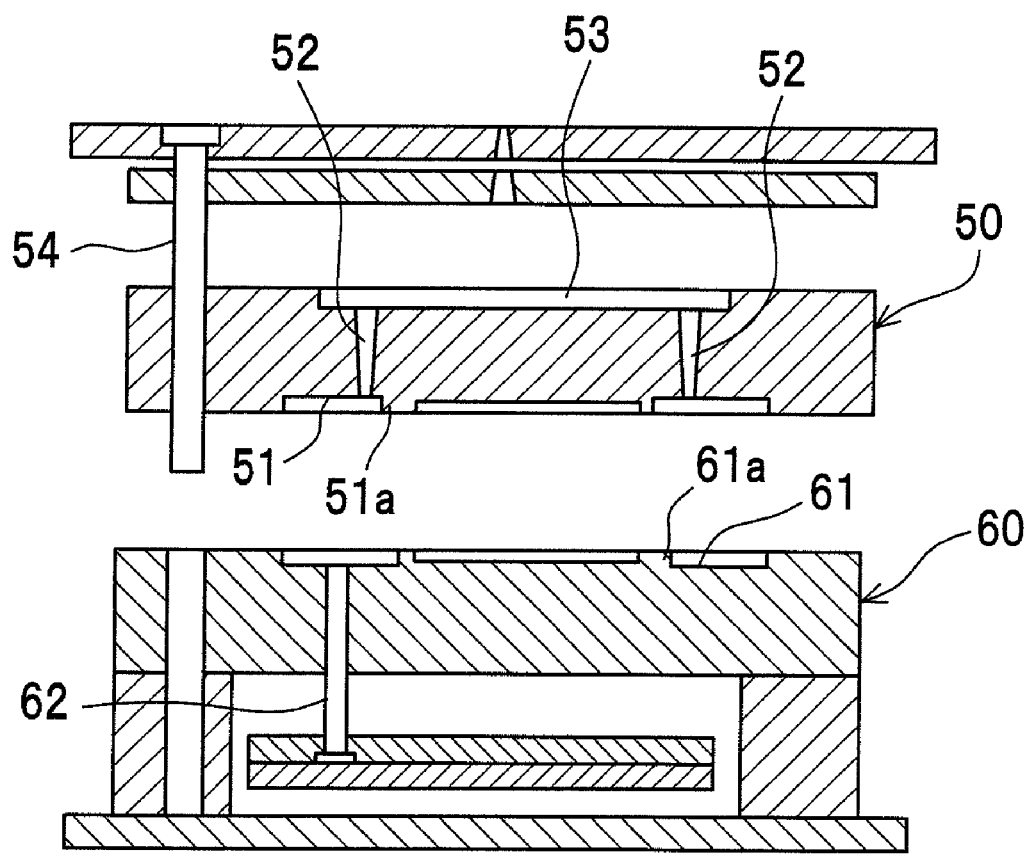
FIG. 6A is a manufacturing process (frame body molding process) view of the electrode-membrane-frame assembly of the first embodiment, showing a structure of the metal mold.

First, as shown in FIG. 6A, an upper mold (first mold) 50 and a lower mold (second mold) 60 for setting the MEA 15 therebetween is prepared. On top of the lower mold 60, on which the MEA 15 is to be set, a lower flow-passage forming surface 61 which is a protruding-and-recessed portion for forming a specified flow passage to make the frame body 2 is formed. Further included in the lower mold 60 is a rod-like thrust member 62 for separating the MEA 15 together with molded resin from the lower flow-passage forming surface 61. On the upper mold 50, the lower surface of which covers the upper surface of the MEA 15, an upper flow-passage forming surface 51 which is a protruding-and-recessed portion for forming a specified flow passage to make the frame body 2 is formed. In addition, a plurality of second support portions 61a (part of the lower mold 60) for supporting the peripheral edge portion 1d of the MEA 15 from its lower side are formed in the lower flow-passage forming surface 61, while a plurality of first support portions 51a (part of the upper mold 50) for supporting the peripheral edge portion 1d of the MEA 15 pressingly from its upper side are formed in the upper flow-passage forming surface 51. The individual first support portions 51a correspond to portions to form the first recessed portions 11a in the frame body 2 to be formed by subsequent injection molding, while the individual second support portions 61a correspond to portions to form the second recessed portions 12a. That is, the first support portions 51a and the second support portions 61a are so formed that their formation positions are alternately placed. Further on the upper flow-passage forming surface 51 are formed a plurality of gates 52 which are resin injection ports, and the individual gates 52 are communicated with a resin introducing portion 53 which is a recessed portion formed on the top surface of the upper mold 50. In the upper mold 50, a mold clamping member 54 for clamping the upper mold 50 and the lower mold 60 in their positioned state is also included.

Figure 6B:
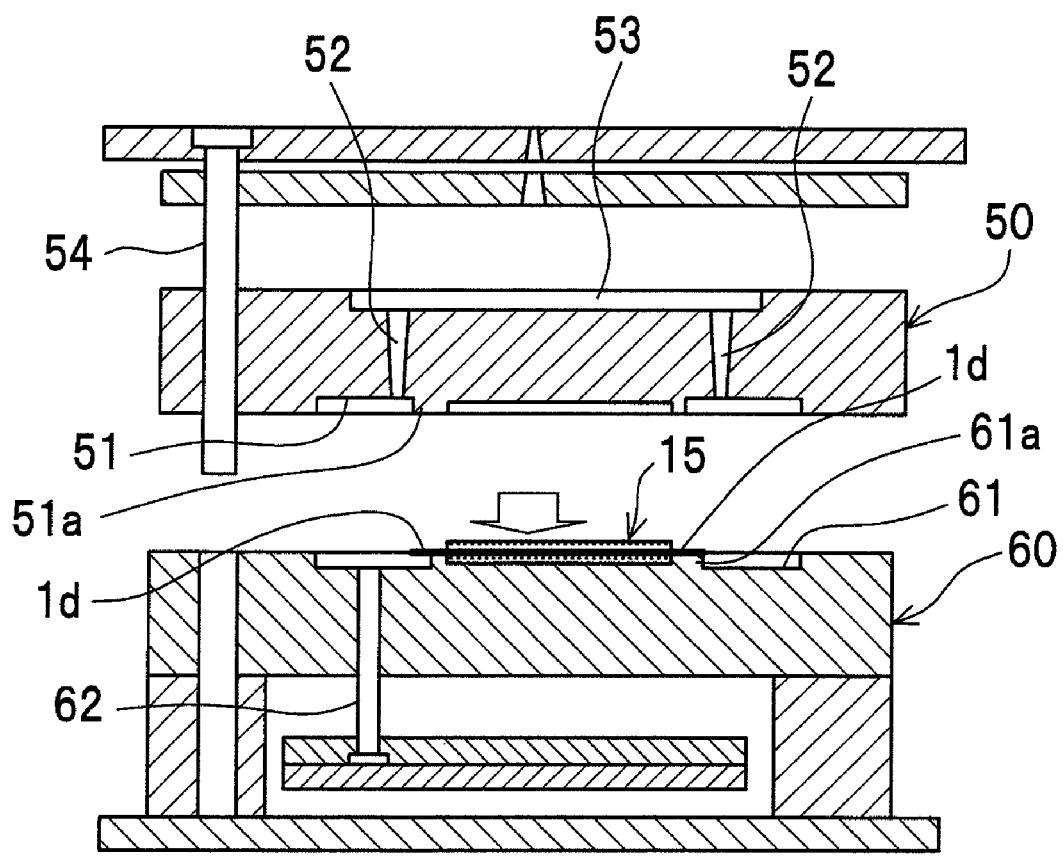
FIG. 6B is a manufacturing process (frame body molding process) view of the electrode-membrane-frame assembly of the first embodiment, showing a state that the MEA is mounted on a lower mold.
Figure 6C:
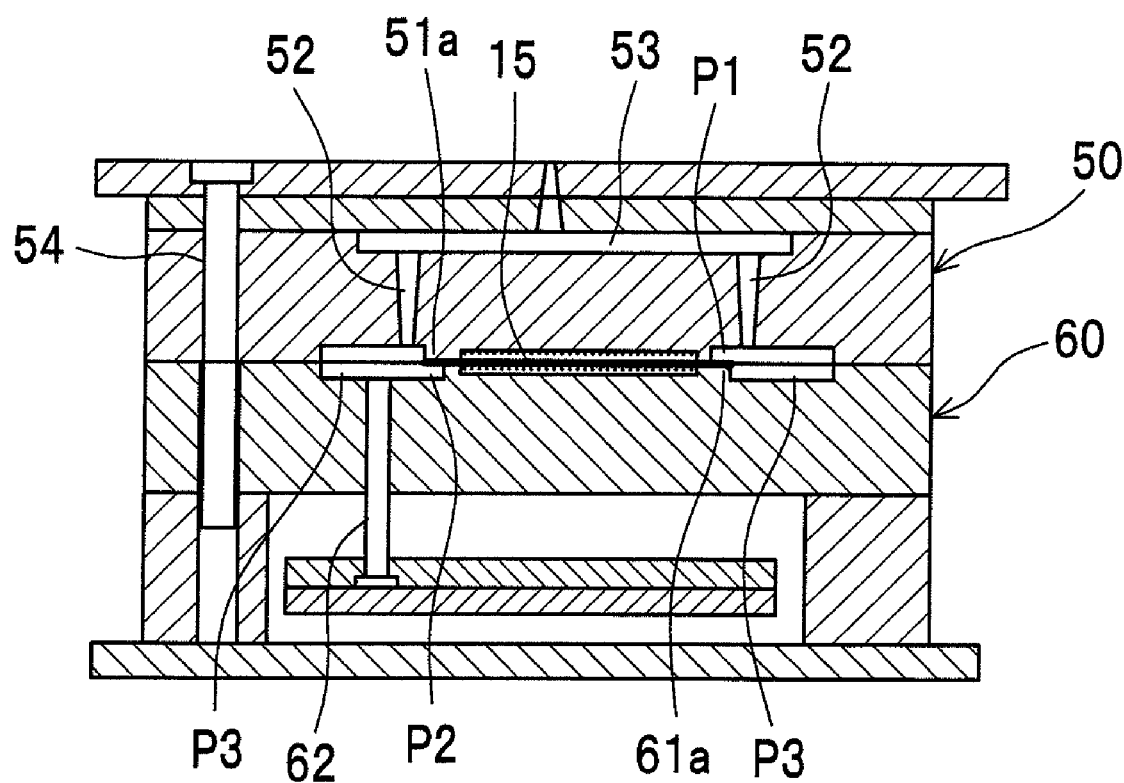
FIG. 6C is a manufacturing process (frame body molding process) view of the electrode-membrane-frame assembly of the first embodiment, showing a state that the mold is clamped.

Next, as shown in FIG. 6B, the MEA 15 is mounted on the lower flow-passage forming surface 61 of the lower mold 60 so that the peripheral edge portion 1d of the MEA 15 is supported by the individual second support portions 61a. Thereafter, as shown in FIG. 6C, by the mold clamping member 54, the upper mold 50 is clamped to the lower mold 60 with the MEA 15 mounted thereon. In this clamped state, the peripheral edge portion 1d of the MEA 15 is supported and retained from its front and back surfaces by the first support portions 51a and the second support portions 61a. Further formed around the MEA 15 are a third resin passage (frame-shaped flow passage) P3 which forms the frame body main part 3, a first resin passage (first passage) P1 which is communicated with an inner edge of the third resin passage P3 and which is formed against the first support portions 51a so as to adjoin the surface of the peripheral edge portion 1d, and a second resin passage P2 which is communicated with an inner edge of the third resin passage P3 and which is formed against the second support portions 61a so as to adjoin the back surface of the peripheral edge portion 1d. In addition, the first resin passage P1 is portions of the frame body 2 corresponding to the first retaining portions 11, and the second resin passage P2 is portions of the frame body 2 corresponding to the second retaining portions 12.

Figure 6D:
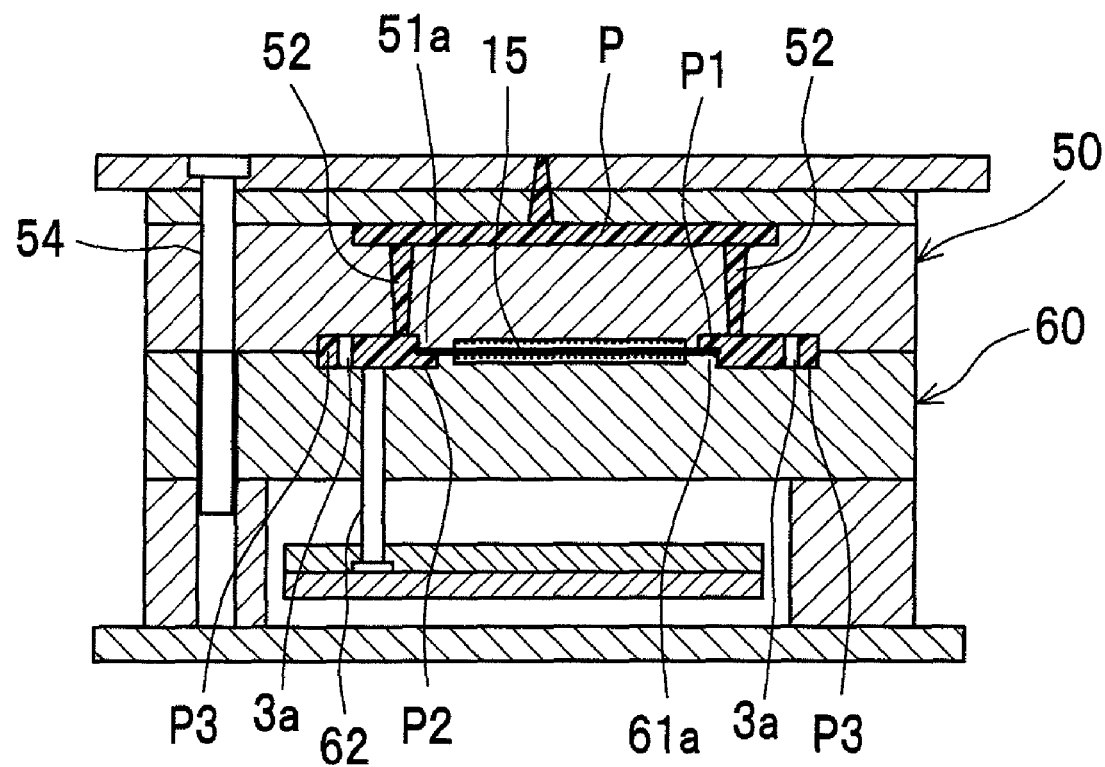
FIG. 6D is a manufacturing process (frame body molding process) view of the electrode-membrane-frame assembly of the first embodiment, showing a state that the resin material is being injected.

Next, as shown in FIG. 6D, the resin material P is injected into the mold. More specifically, the resin material P injected into the resin introducing portion 53 of the upper mold 50 is injected into the third resin passage P3 through the individual gates 52 so as to be filled into the third resin passage P3. The resin material P injected into the third resin passage P3 is let to further flow into the communicated first resin passage P1 and second resin passage P2 so as to be filled therein. In this injection molding, the resin material P is injected into the first to third resin passages P1, P2, P3 in a high-temperature, high-pressure state. However, since the peripheral edge portion 1d of the polyelectrolyte membrane 1a is held and fixed in the resin passages from its front-and-back surface sides by the first support portions 51a and the second support portions 61a, the peripheral edge portion 1d of the polyelectrolyte membrane 1a can securely be prevented from being floated up or peeled up.

Figure 6E:
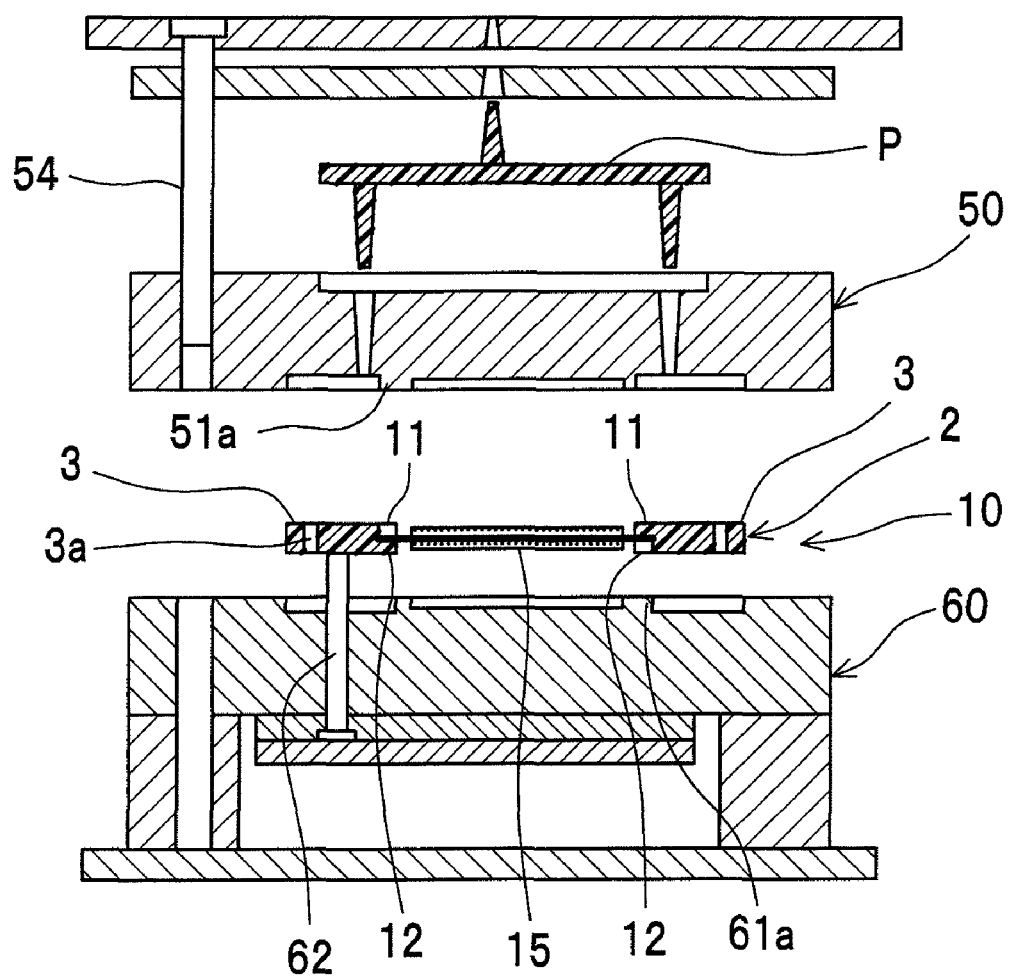
FIG. 6E is a manufacturing process (frame body molding process) view of the electrode-membrane-frame assembly of the first embodiment, showing a state that the frame body retaining the MEA has been completed.

When the resin material P is completely filled into the individual resin passages P1 to P3, the resin is subjected to solidifying. Thereafter, as shown in FIG. 6E, the clamping of the upper mold 50 and the lower mold 60 is released, so that the MEA 15 in which the frame body 2 has been formed at positions corresponding to the resin passages is separated from the lower mold 60 by the thrust member 62. Thus, the injection molding is completed.

As a result of fulfillment of the injection molding, the frame body 2 in which the peripheral edge portion 1d of the polyelectrolyte membrane 1a is retained from its front-and-back surfaces by the first retaining portions 11 and the second retaining portions 12 is formed as shown in FIG. 3.

Figure 7A:
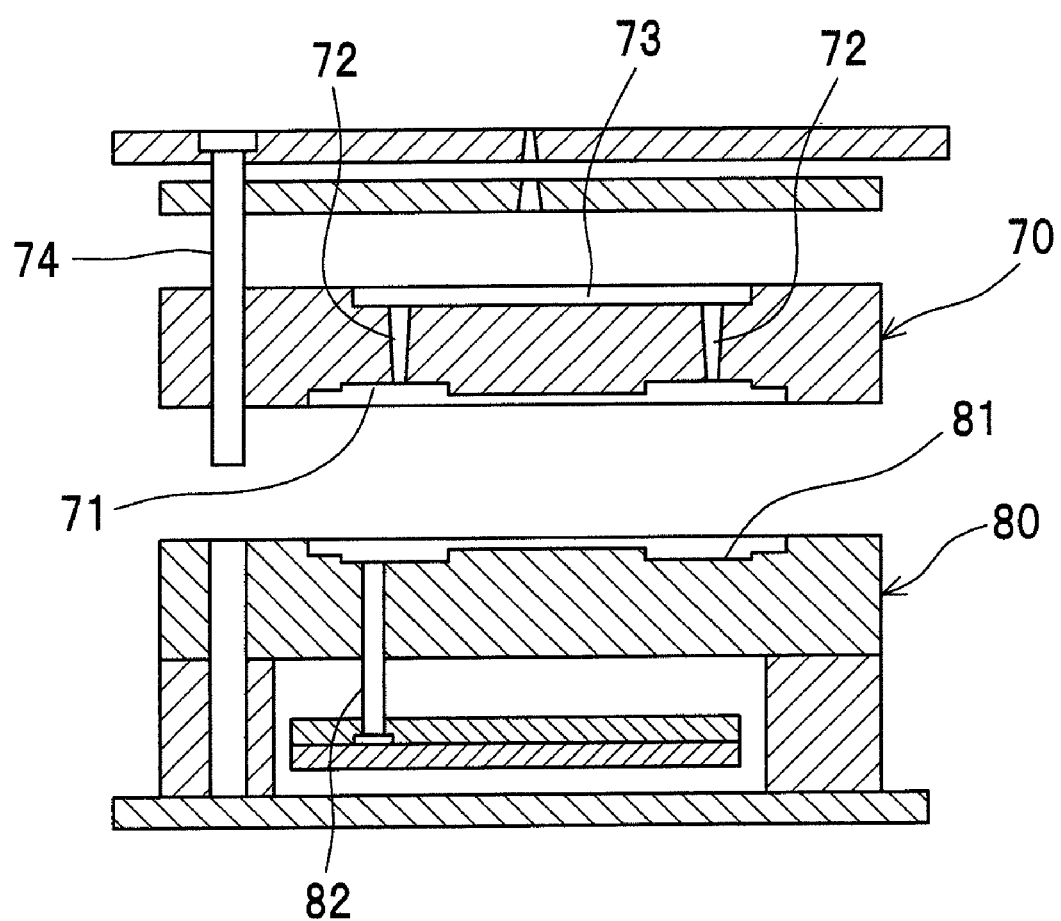
FIG. 7A is a manufacturing process (elastic member molding process) view of the electrode-membrane-frame assembly of the first embodiment, showing a structure of the metal mold.

Next, in the electrode-membrane-frame assembly 10 formed as shown above, the elastic members 13, 14 are formed by injection molding. More specifically, as shown in FIG. 7A, an upper mold 70 and a lower mold (second mold) for setting the electrode-membrane-frame assembly 10 therebetween is prepared. On top of the lower mold 80, on which the electrode-membrane-frame assembly 10 is to be set, a lower flow-passage forming surface 81 which is a protruding-and-recessed portion for forming a specified flow passage (fifth resin passage P5) to make the cathode-side elastic members 14 is formed. Further included in the lower mold 80 is a rod-like thrust member 82 for separating the molded resin from the lower flow-passage forming surface 81. On the upper mold 70, the lower surface of which covers the upper surface of the electrode-membrane-frame assembly 10, an upper flow-passage forming surface 71 which is a protruding-and-recessed portion for forming a specified flow passage (fourth resin passage P4) to make the anode-side elastic members 13 is formed. More specifically, the fourth resin passage P4 is formed at portions corresponding to the first recessed portions 11a, while the fifth resin passage P5 is formed at portions corresponding to the second recessed portions 12a. Further on the upper flow-passage forming surface 71 are formed a plurality of gates 72 which are resin injection ports, and the individual gates 72 are communicated with a resin introducing portion 73 which is a recessed portion formed on the top surface of the upper mold 70. In the upper mold 70, a mold clamping member 84 for clamping the upper mold 70 and the lower mold 80 in their positioned state is also included.

Figure 7B:
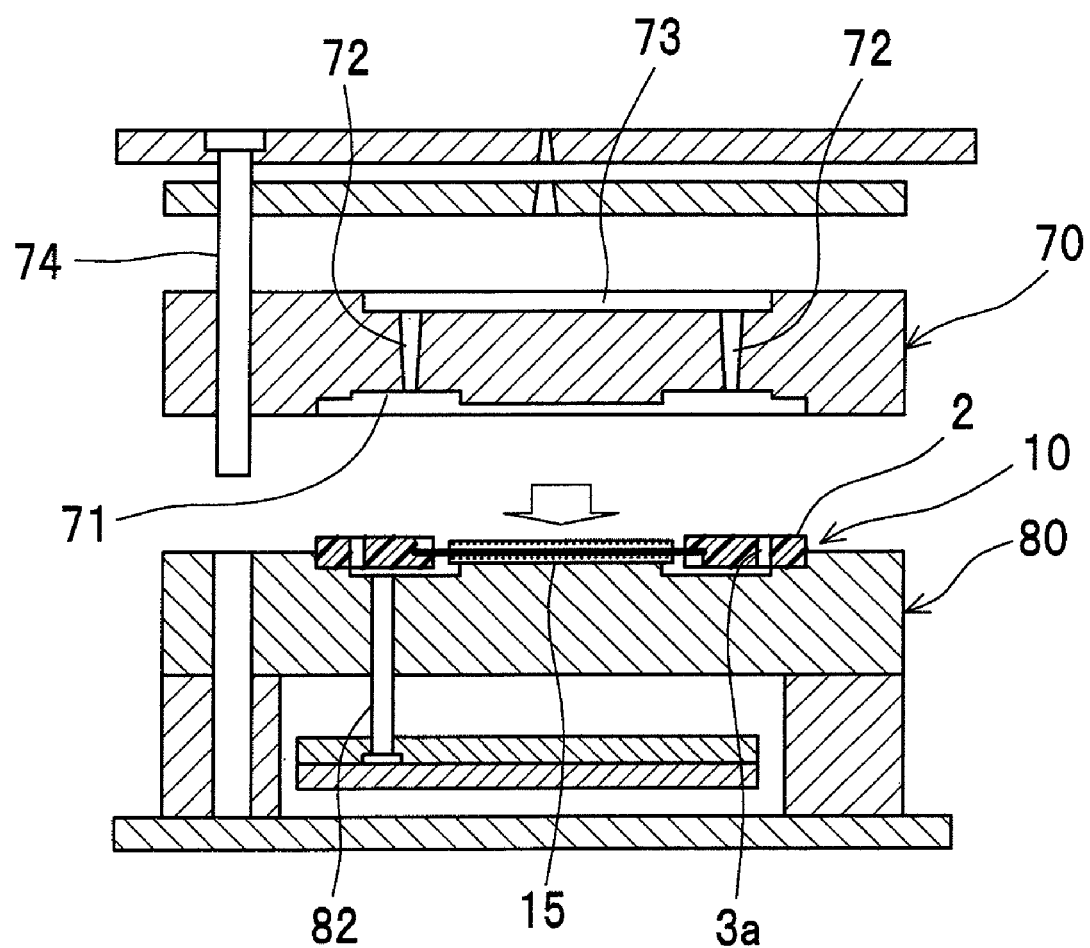
FIG. 7B is a manufacturing process (elastic member molding process) view of the electrode-membrane-frame assembly of the first embodiment, showing a state that the frame body retaining the MEA is mounted on the lower mold.
Figure 7C:
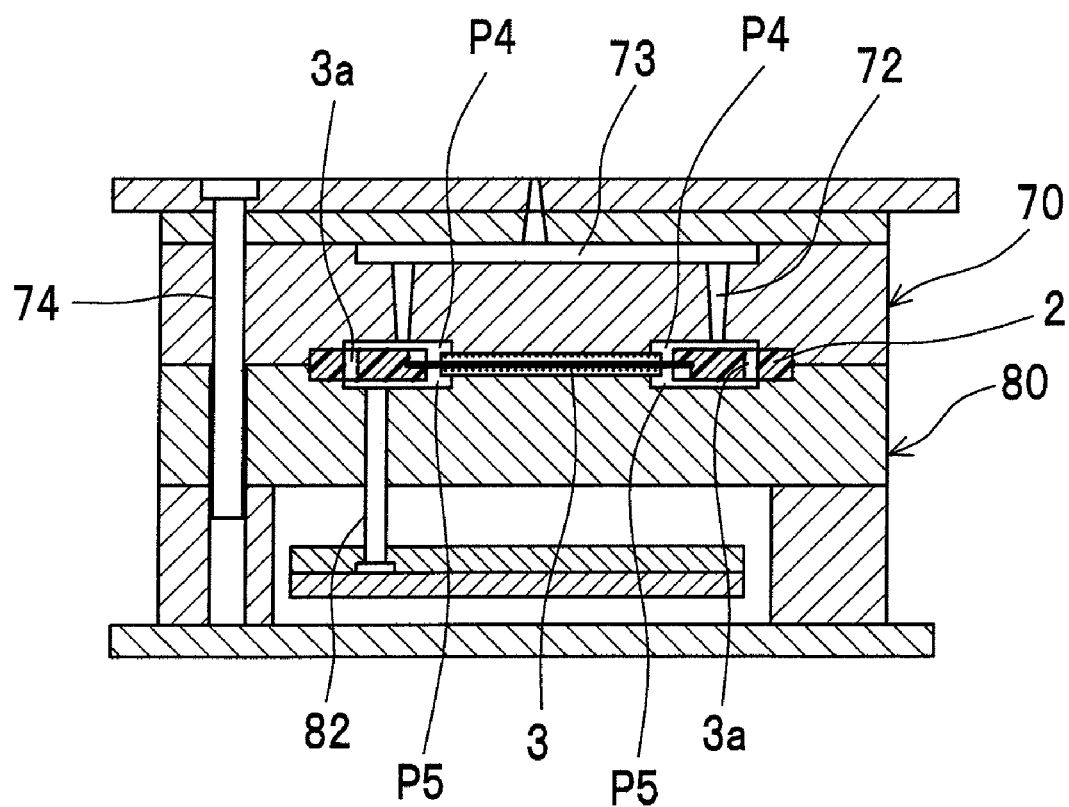
FIG. 7C is a manufacturing process (elastic member molding process) view of the electrode-membrane-frame assembly of the first embodiment, showing a state that the mold is clamped.

Next, as shown in FIG. 7B, the electrode-membrane-frame assembly 10 is mounted on the lower flow-passage forming surface 81 of the lower mold 80. Thereafter, as shown in FIG. 7C, by a mold clamping member 74, the upper mold 70 is clamped to the lower mold 80 with the electrode-membrane-frame assembly 10 mounted thereon. In this clamped state, the fourth resin passage P4 is formed at positions corresponding to the individual first recessed portions 11a, and the fifth resin passage P5 is formed at positions corresponding to the individual second recessed portions 12a. In addition, as shown in FIG. 7C, through holes 3a are formed in the frame body main part 3 so that the fourth resin passage P4 and the fifth resin passage P5 are communicated with each other by the through holes 3a.

Figure 7D:
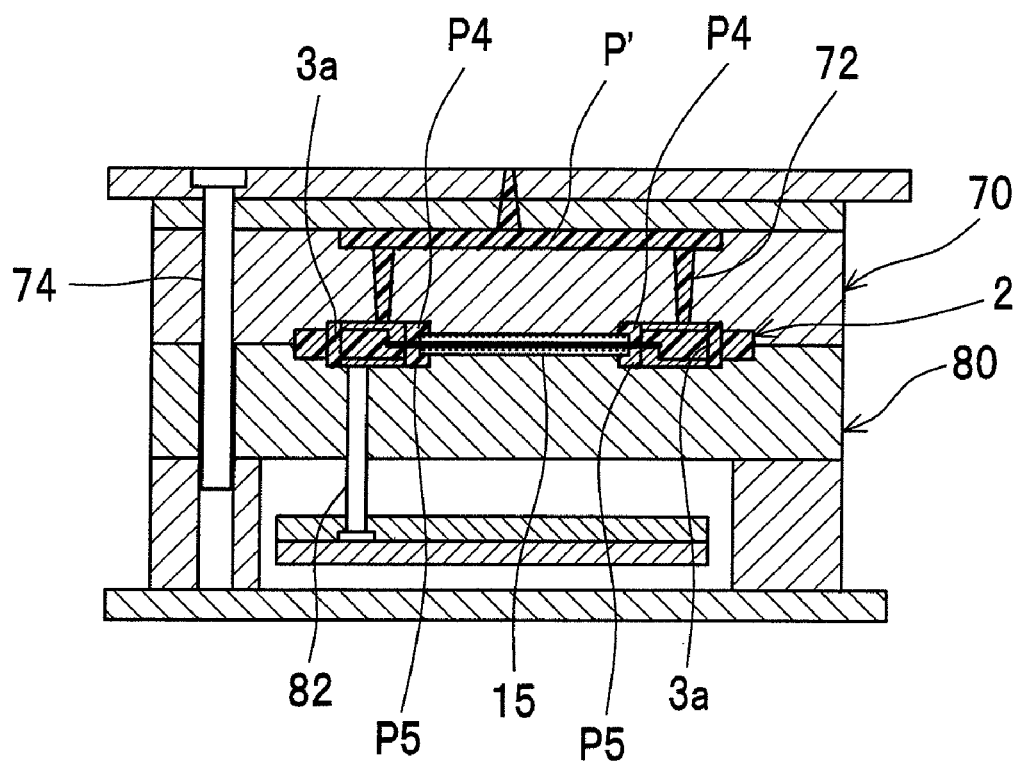
FIG. 7D is a manufacturing process (elastic member molding process) view of the electrode-membrane-frame assembly of the first embodiment, showing a state that the resin material is being injected.

Next, as shown in FIG. 7D, a resin material P' for forming the elastic members is injected into the mold. More specifically, the resin material P' injected into the resin introducing portion 73 of the upper mold 70 is injected into the fourth resin passage P4 through the individual gates 72 so as to be filled into the fourth resin passage P4. The resin material P' injected into the fourth resin passage P4 is let to further flow into the fifth resin passage P5 communicated with the fourth resin passage P4 via the through holes 3a the through holes 3a so as to be filled therein.

Figure 7E:
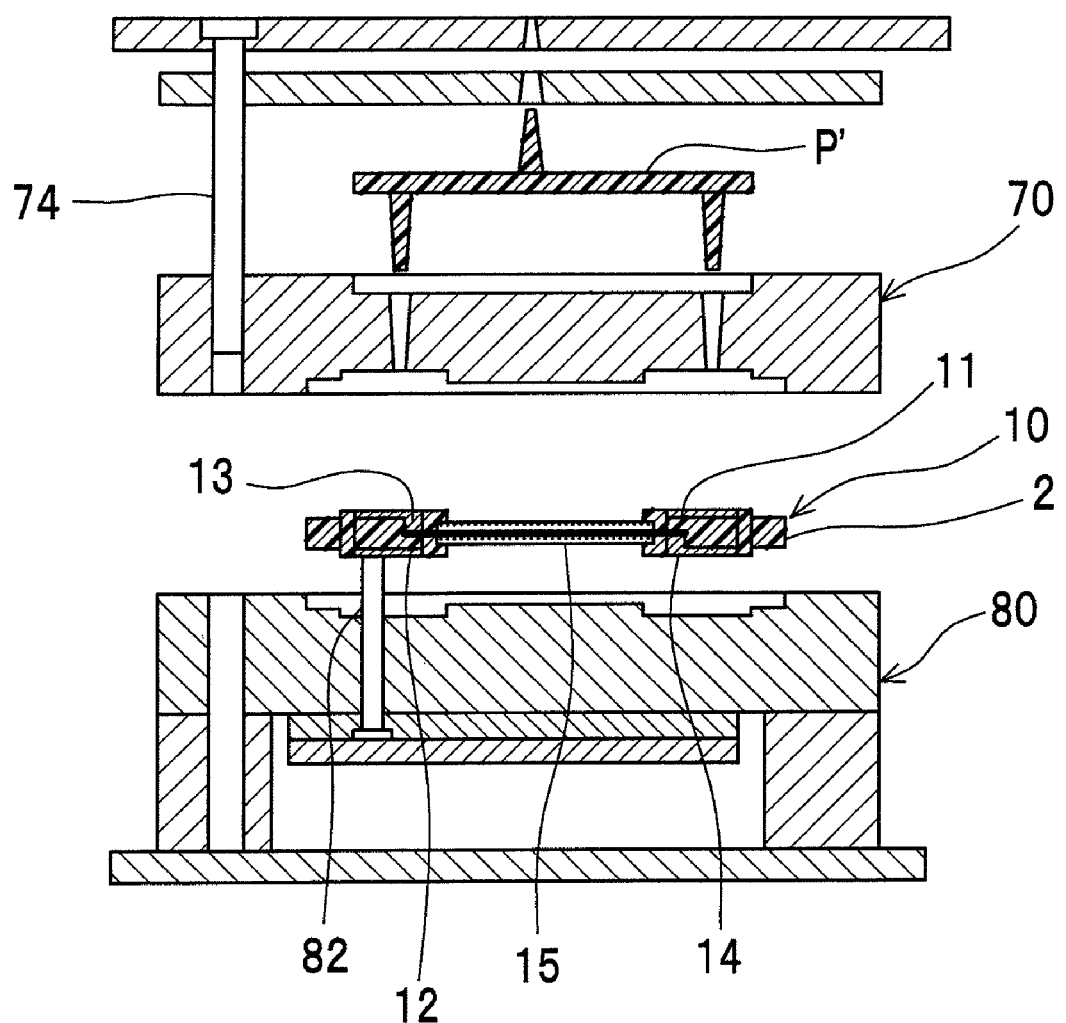
FIG. 7E is a manufacturing process (elastic member molding process) view of the electrode-membrane-frame assembly of the first embodiment, showing a state that the frame body with the elastic member formed thereon has been completed.

When the resin material P' is completely filled into the individual resin passages P4 and P5, the resin is subjected to curing. Thereafter, as shown in FIG. 7E, the clamping of the upper mold 70 and the lower mold 80 is released, so that the electrode-membrane-frame assembly 10 in which the elastic members 13, 14 have been formed at positions corresponding to the resin passages is separated from the lower mold 80 by the thrust member 82. Thus, the injection molding is completed.

As a result of fulfillment of the injection molding, the electrode-membrane-frame assembly 10 in which the anode-side elastic members 13 and the cathode-side elastic members 14 have been formed is formed as shown in FIG. 4.

With the use of the electrode-membrane-frame assembly 10 manufactured as described above, the following various advantageous effects can be obtained.

First, by the adoption of the structure that the peripheral edge portion 1d of the polyelectrolyte membrane 1a is retained between the first retaining portions 11 and the second retaining portions 12 alternately protruded from the inner edge of the frame body main part 3 as shown in FIG. 3, it becomes possible in the manufacture process by injection molding to carry out the injection of the resin material P in the state that the peripheral edge portion 1d of the MEA 15 is securely retained and fixed by the first support portions 51a, which are portions of the mold corresponding to the first recessed portions 11a between neighboring first retaining portions 11, and the second support portions 61a, which are portions of the mold corresponding to the second recessed portions 12a between neighboring second retaining portions 12, during the manufacture by injection molding. Accordingly, during the injection molding process, the polyelectrolyte membrane 1a can securely be prevented from being floated up or peeled up due to the injection of high-temperature, high-pressure resin material, so that its yield rate can be improved.

Also, the frame body 2 that retains the MEA 15 can be manufactured by a one-time injection molding process, and the electrode-membrane-frame assembly 10 having the elastic members 13, 14 can be manufactured by subsequently performing another one-time injection molding process for forming the elastic members 13, 14. Accordingly, the productivity of the manufacturing process of the electrode-membrane-frame assembly can be enhanced.

Also, by the placement that the anode-side elastic members 13 and the cathode-side elastic members 14 are alternately positioned along the peripheral edge portion 1d in the front-and-back surfaces of the polyelectrolyte membrane 1a so as to fill the first recessed portions 11a and the second recessed portions 12a in the electrode-membrane-frame assembly 10 as shown in FIG. 4, the front-and-back surfaces of the polyelectrolyte membrane 1a can securely be sealed from being communicated with each other, so that the occurrence of the crossleak phenomenon can be suppressed. In particular, by the presence of the overlap regions R between the placement regions of the anode-side elastic members 13 and the placement regions of the cathode-side elastic members 14 as shown in the schematic sectional view of FIG. 5A, a more reliable sealing can be achieved.

When such elastic members 13, 14 are placed in a portion indicated by S1 in FIG. 4 so as to fill inner spaces of the first recessed portions 11a and the second recessed portions 12a, the effect for sealing the communications between the front-and-back surfaces of the polyelectrolyte membrane 1a can be obtained, so that the occurrence of the crossleak phenomenon can be suppressed effectively. Accordingly, the placement structure of the elastic members 13, 14 in this first embodiment is not limited to the mode shown in FIG. 4, and it is also allowable to adopt, for example, a placement structure that the anode-side elastic members 13 and the cathode-side elastic members 14 are placed so as to fill the portion indicated by S1 in FIG. 4, i.e., the inner spaces of the first recessed portions 11a and the second recessed portions 12a.

Meanwhile, in the placement structure of the elastic members 13, 14 of the first embodiment shown in FIG. 4, the elastic members 13, 14 are placed so as to extend from the inner edge of the frame body main part 3 to positions where end portions of the anode electrode 1b and the cathode electrode is are covered. That is, the elastic members 13, 14 are placed in portions indicated by S1 and S2 in FIG. 4. By adopting such a placement structure, spaces which are present between the inner edge of the frame body 2 and outer-edge end portions of the anode electrode 1b and the cathode electrode 1c and which extend along a direction D in the figure can be isolated and sealed by the elastic members 13, 14, respectively. Accordingly, the fuel gas can be prevented from shortcutting the spaces in the direction D of the figure without making contact with the surface of the anode electrode 1b, and the oxidizer gas can be prevented from shortcutting the spaces in the direction D of the figure without making contact with the surface of the cathode electrode 1c. Thus, the power generating efficiency of the fuel cell can be improved. Moreover, by the placement of the elastic members 13, 14 that are placed so as to extend up to the inner edge of the frame body main part 3, it becomes possible to keep the elastic members 13, 14 in contact with the outer-edge end of the polyelectrolyte membrane 1a with reliability, so that the occurrence of the crossleak phenomenon can be suppressed effectively as described above.

According to the electrode-membrane-frame assembly 10 of this first embodiment, a sealing for suppressing the crossleak phenomenon due to the elastic members 13, 14 is provided in the portion S1. Therefore, spaces between the inner edge of the frame body 2 and the end portions of the anode electrode 1b and the cathode electrode 1c, i.e., the portion S2 in FIG. 4 can be suppressed to a minimum size within a range determined in consideration of manufacturing dimensional errors of the frame body 2 and the electrodes 1b, 1c or the like. That is, the inner edge of the frame body 2 and the end portions of the electrodes 1b, 1c can be reduced in their mutual distance so as to be closer to each other. Accordingly, in the electrode-membrane-frame assembly 10, areas occupied by the electrodes 1b, 1c can be ensured efficiently, making it possible to achieve a more compact fuel cell while improving its power generating efficiency.

Figure 8:
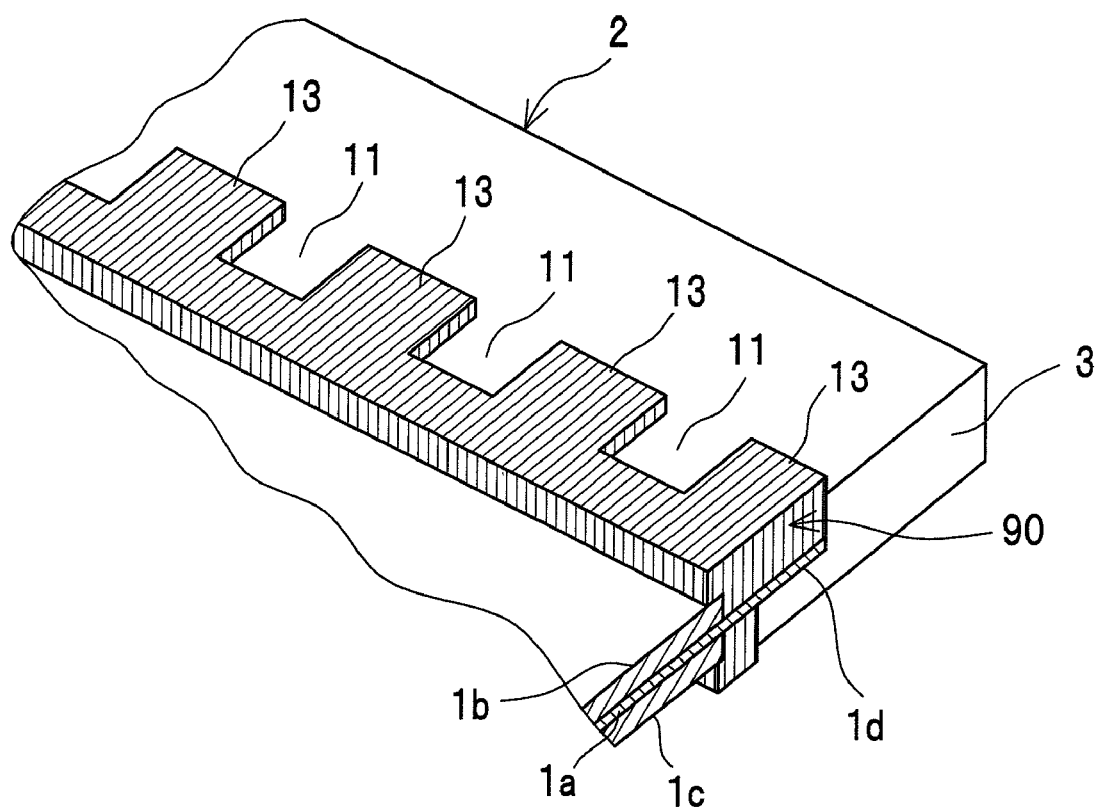
FIG. 8 is a schematic view showing a placement structure of the elastic members according to modification of the first embodiment.

The electrode-membrane-frame assembly 10 of the first embodiment adopts a placement structure that, as shown in FIG. 4, the individual anode-side elastic members are placed independently of one another while the individual cathode-side elastic members 14 are placed independently of one another. However, the first embodiment is not limited to such a placement structure only. Instead, for example, as in the case of an elastic member 90 according to a modification shown in the schematic perspective view of FIG. 8, it is also allowable to adopt a placement structure that the individual anode-side elastic members 13 are integrally formed so as to be coupled to one another at the inner edge of the frame body 2. In such an elastic member 90, since the whole spaces between the inner edge of the frame body 2 and the end portions of the electrodes 1b, 1c can be filled with the elastic member, the effect for suppressing the shortcutting of the fuel gas or the like can be further enhanced.

Second Embodiment

Next, a structure of an electrode-membrane-frame assembly 210 according to a second embodiment of the invention will be described below with reference to schematic perspective views shown in FIGS. 9 and 10. In the electrode-membrane-frame assembly 210 of this second embodiment, like component members in conjunction with the electrode-membrane-frame assembly 10 of the first embodiment are designated by like reference signs and their description is omitted.

Figure 9:
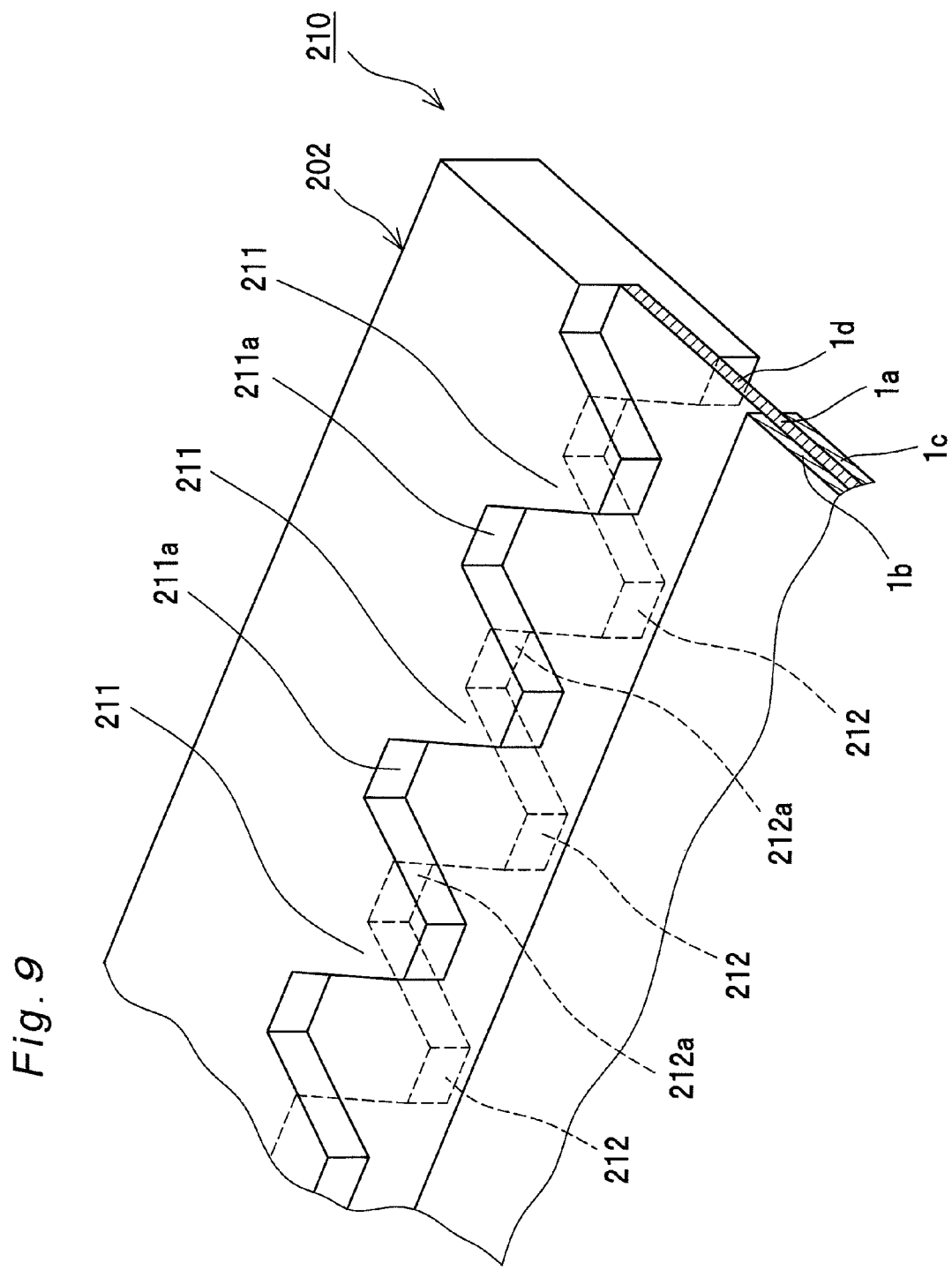
FIG. 9 is a partial schematic perspective view (with no elastic members) showing a structure of an electrode-membrane-frame assembly according to a second embodiment of the invention.

As shown in FIG. 9, the electrode-membrane-frame assembly 210 of the second embodiment has generally trapezoidal-shaped first retaining portions 211 and second retaining portions 212 in a frame body 202, structurally differing in this point from the first embodiment.

More specifically, as shown in FIG. 9, each of the first retaining portions 211 is formed shorter on its projective end side (upper end side) and trapezoidal in right-and-left symmetry, while the second retaining portions 212 are formed identical in configuration to the first retaining portions 211. The first retaining portions 211 and the second retaining portions 212 are arrayed at a uniform interval pitch so that the first retaining portions 211 and the second retaining portions 212 are alternately positioned with each other. Between neighboring first retaining portions 211 are formed first recessed portions 211a each having an inverted-trapezoidal shape in comparison to the first retaining portions 211. Similarly, second recessed portions 212a each having an inverted-trapezoidal shape are also placed between neighboring second retaining portions 212.

Figure 10:
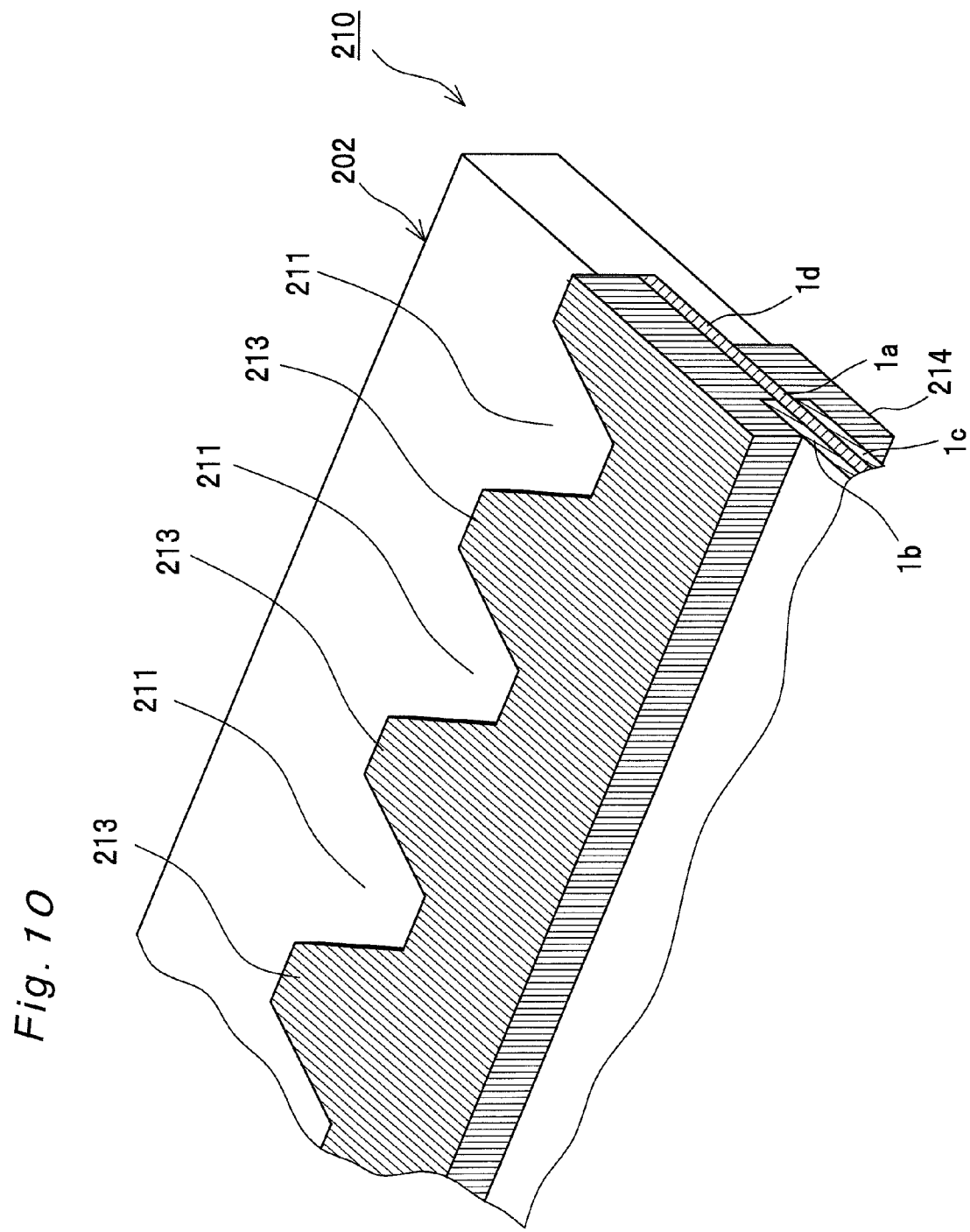
FIG. 10 is a partial schematic perspective view (with elastic members) showing a structure of the electrode-membrane-frame assembly according to the second embodiment of the invention.

Further, as shown in FIG. 10, anode-side elastic members 213 and cathode-side elastic members 214 are placed so as to fill inner spaces of the first recessed portions 211a and the second recessed portions 212a, respectively. In addition, the anode-side elastic members 213 and the cathode-side elastic members 214 are integrally formed so as to be coupled to one another, respectively.

With such a structure of the electrode-membrane-frame assembly 210 of this second embodiment, as shown in FIG. 9, oblique-side end portions 211b of the trapezoids of the first retaining portions 211 and oblique-side end portions 212b of the trapezoids of the second retaining portions 212 are inevitably crossed with each other as viewed from their thicknesswise direction. Therefore, between placement regions of the anode-side elastic members 213 that are placed so as to fill the first recessed portions 211a and placement regions of the cathode-side elastic members 214 that are placed so as to fill the second recessed portions 212a, overlap regions R caused by the crossing of the oblique sides of the trapezoids are securely formed. Accordingly, a reliable sealing along the peripheral edge portion 1d of the polyelectrolyte membrane 1a can be fulfilled by the respective elastic members 213, 214, so that the crossleak-phenomenon suppressing effect can be fulfilled with reliability. In particular, with the use of such a method that ensures the overlap regions R by the trapezoidal-shaped structure, there is an advantage that the overlap regions R can reliably be formed even if positional shifts may be involved more or less in manufacturing dimensions of the frame body 202 due to manufacturing errors or the like.

Figure 11:
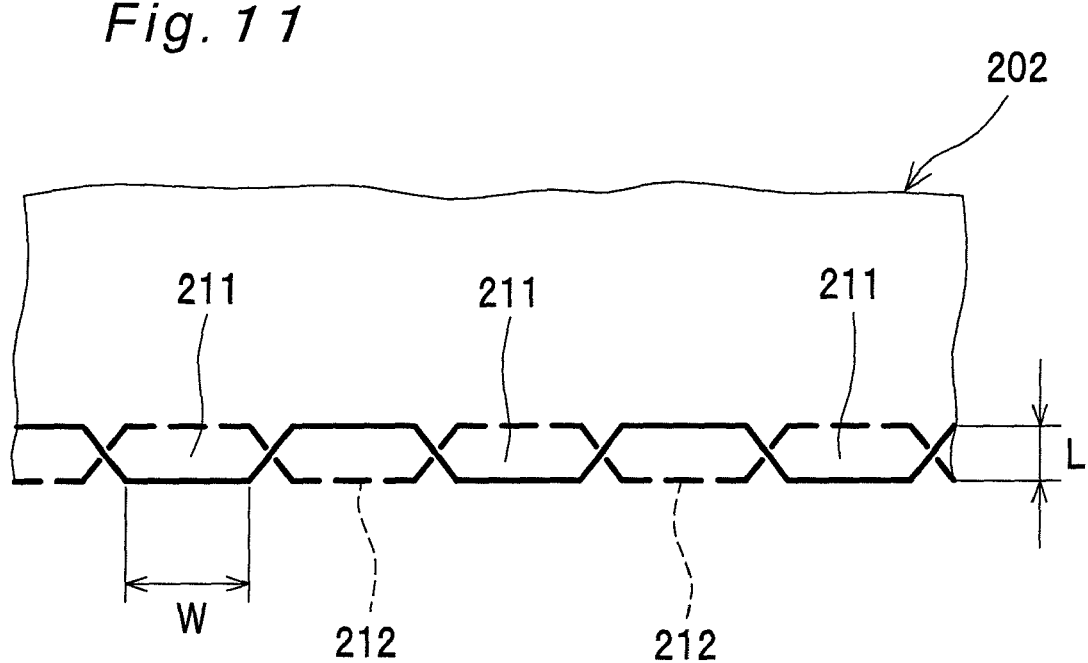
FIG. 11 is a schematic explanatory view showing a dimensional example in the electrode-membrane-frame assembly of the second embodiment.

As a dimensional example of such a trapezoidal-shaped structure, as shown in FIG. 11, a shorter-side width W of the retaining portions 211 and 212 is preferably set to within a range of 1 mm to 15 mm in terms of practical use. The reason of this is that too smaller widths W would lead to occurrence of filling failures of resin material in molded products and to cost increases in mold machining. Conversely, too larger widths W would result in a lowered pressing effect, i.e. lowered sealing effect, for the polyelectrolyte membrane la by the elastic members 213, 214.

Also, a depth L of the retaining portions 211 and 212 is preferably set to within a range of 1 mm to 8 mm in terms of practical use. The reason of this is that too smaller depths L would result in a lowered pressing effect for the polyelectrolyte membrane 1a, while too larger depths L would lead to increases in useless areas in the peripheral edge portion 1d of the polyelectrolyte membrane 1a.

Figure 12:
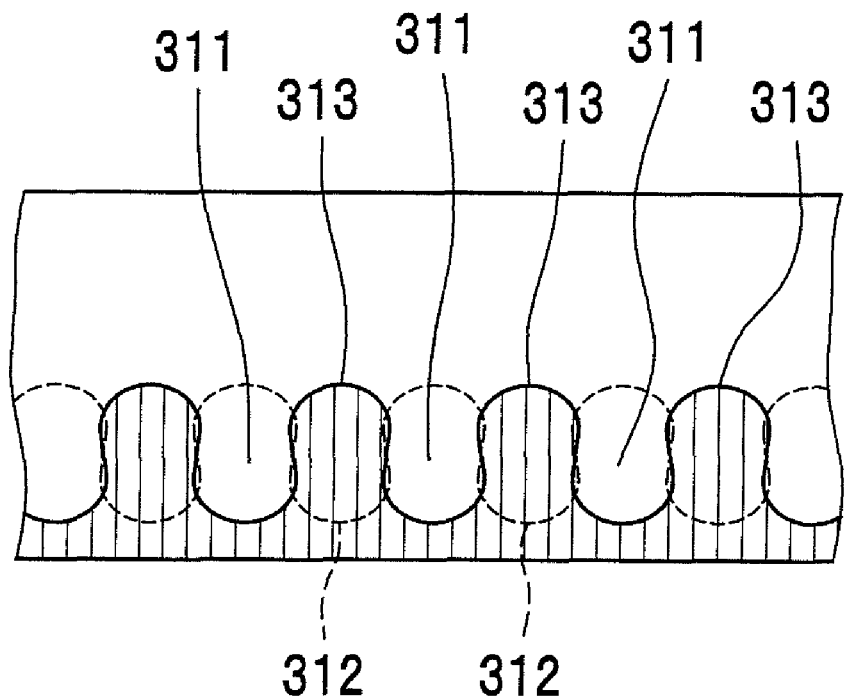
FIG. 12 is a schematic view showing a structure of an electrode-membrane-frame assembly according to a modification of the invention.
Figure 13:
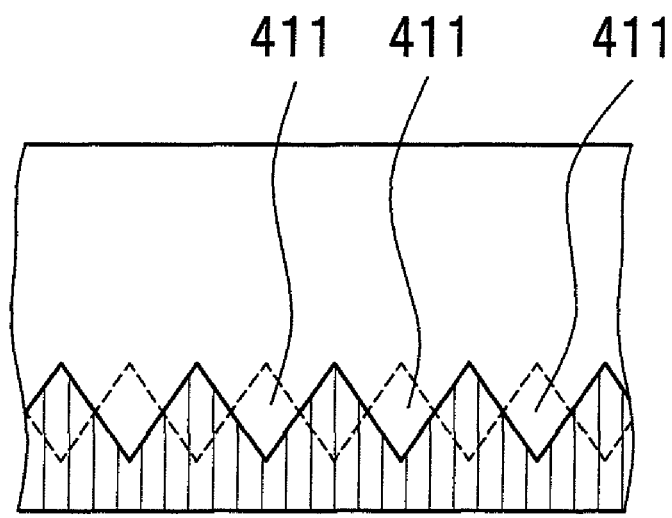
FIG. 13 is a schematic view showing a structure of an electrode-membrane-frame assembly according to another modification of the invention.
Figure 14:
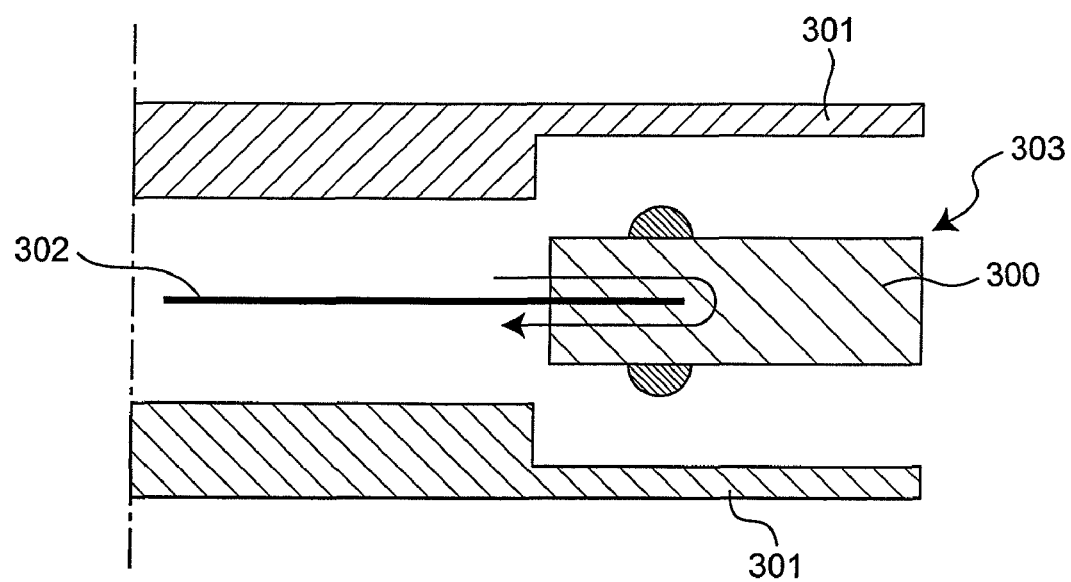
FIG. 14 is an exploded sectional view of an MEA and separators of a conventional fuel cell.
Figure 15A:
FIG. 15A is a schematic explanatory view of a manufacturing method of the MEA of the conventional fuel cell.
Figure 15B:
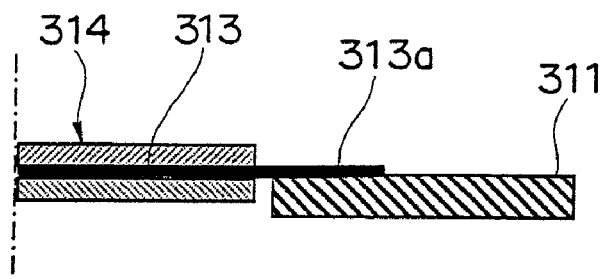
FIG. 15B is a schematic explanatory view of the manufacturing method of the MEA of the conventional fuel cell.
Figure 15C:
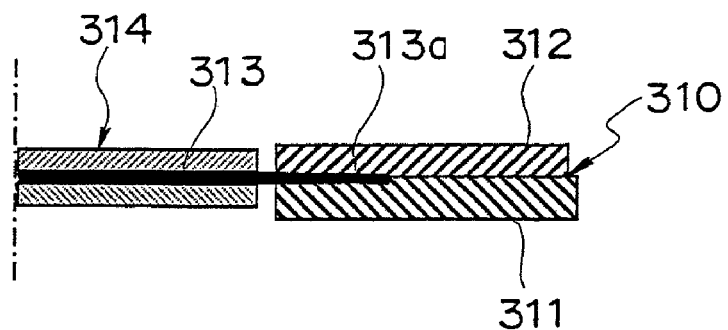
FIG. 15C is a schematic explanatory view of the manufacturing method of the MEA of the conventional fuel cell.
Figure 16A:
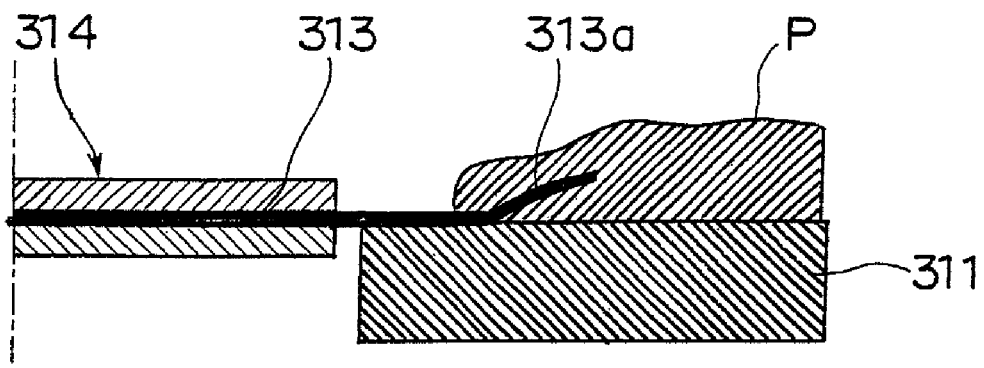
FIG. 16A is a schematic explanatory view of a membrane peeling-up phenomenon in the conventional manufacturing method of the MEA.
Figure 16B:
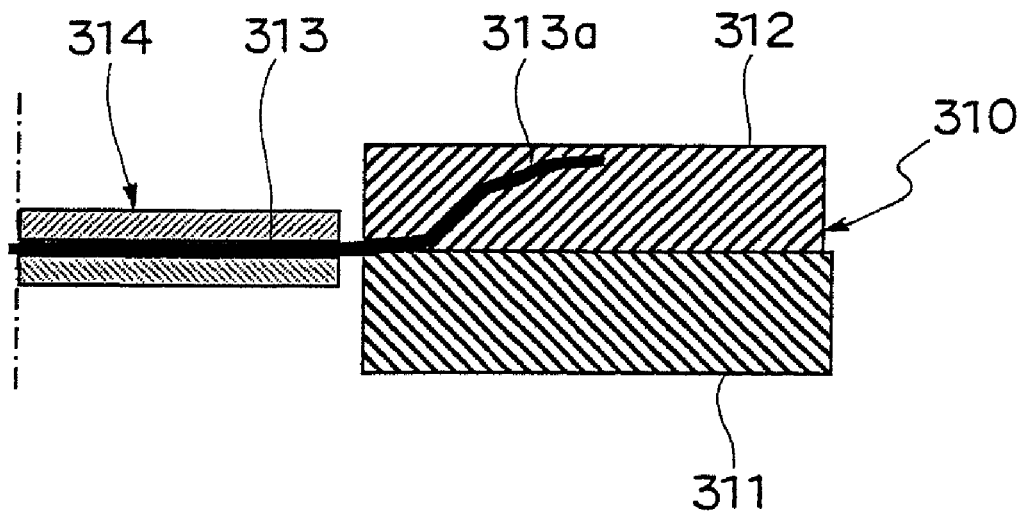
FIG. 16B is a schematic explanatory view of the membrane peeling-up phenomenon in the conventional manufacturing method of the MEA.

The foregoing individual embodiments have been described on a case where the planar configuration of the first retaining portions and the second retaining portions is a rectangular or trapezoidal shape. However, other various configurations are also adoptable. For instance, it is also allowable that as shown in the schematic view of FIG. 12, first retaining portions 311 and second retaining portions 312 are formed as roughly circular-shaped protruding portions, while elastic members 313 placed so as to fill between those retaining portions are engaged with the first retaining portions 311 in a direction extending along the surface of the polyelectrolyte membrane 1a. It is yet also allowable that as shown in the schematic view of FIG. 13, first retaining portions 411 and second retaining portions 412 are formed as generally triangular-shaped protruding portions, by which effects generally similar to those by the trapezoidal shape of the second embodiment can also be obtained. As the planar shape of the retaining portions, other various shapes such as semicircular and polygonal shapes may be adopted.

Third Embodiment

Next, a structure of an electrode-membrane-frame assembly 510 according to a third embodiment of the invention is described below with reference to schematic perspective views shown in FIGS. 17 and 18. In the electrode-membrane-frame assembly 510 of this third embodiment, like component members in conjunction with the electrode-membrane-frame assembly 10 of the first embodiment are designated by like reference signs and their description is omitted.

Figure 17:
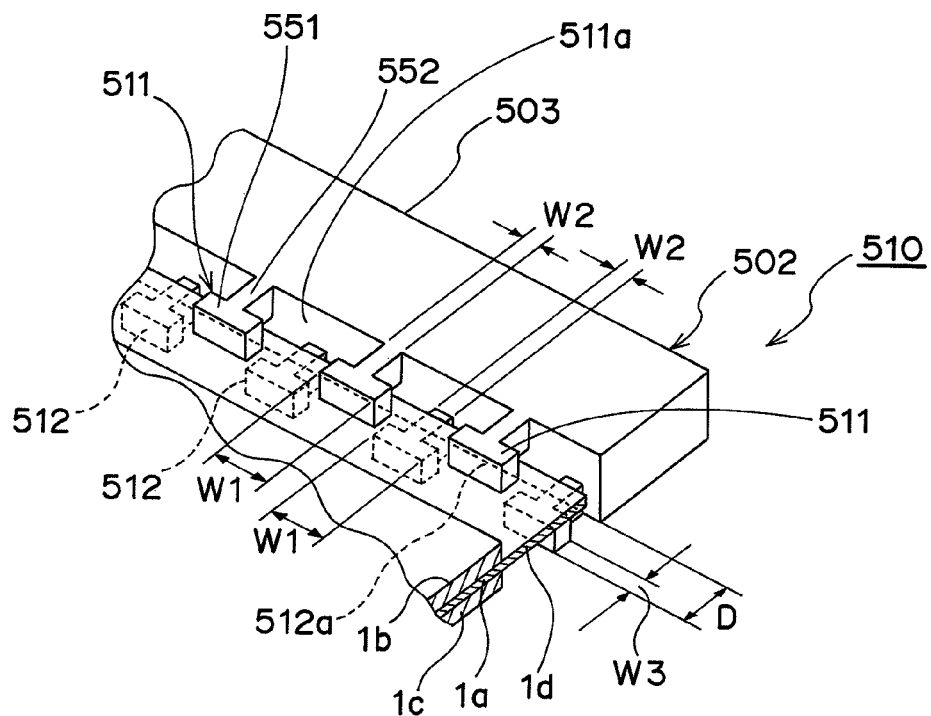
FIG. 17 is a partial schematic perspective view (with no elastic members) showing a structure of an electrode-membrane-frame assembly according to a third embodiment of the invention.

As shown in FIG. 17, the electrode-membrane-frame assembly 510 of the third embodiment has generally T-shaped-in-plan-view, so-called hammer head-shaped first retaining portions 511 and second retaining portions 512 in a frame body 502, structurally differing in this point from the first and second embodiments.

More specifically, as shown in FIG. 17, each of the first retaining portions 511 has a right-and-left symmetrical configuration composed of: a projective end portion 551 which is formed as a projective end portion projecting toward the center of the frame body 502 and which is further formed into a generally rectangular-parallelopiped shape whose longitudinal direction is along the peripheral edge portion 1d of the polyelectrolyte membrane 1a; and a coupling portion 552 which has a width W2 smaller than a width W1 of the projective end portion 551 in the direction along the peripheral edge portion 1d of the polyelectrolyte membrane 1a and which couples the projective end portion 551 to a frame body main part 503. Also, the second retaining portions 512 are formed identical in configuration to the first retaining portions 511. The first retaining portions 511 and the second retaining portions 512 are arrayed at a uniform interval pitch so that the first retaining portions 511 and the second retaining portions 512 are alternately positioned with each other.

As shown in FIG. 17, between neighboring first retaining portions 511 are placed first recessed portions 511a each having a roughly inverted-T shape in comparison to the first retaining portions 511. Similarly, second recessed portions 512a each having an inverted-T shape are also placed between neighboring second retaining portions 512.

Figure 18:
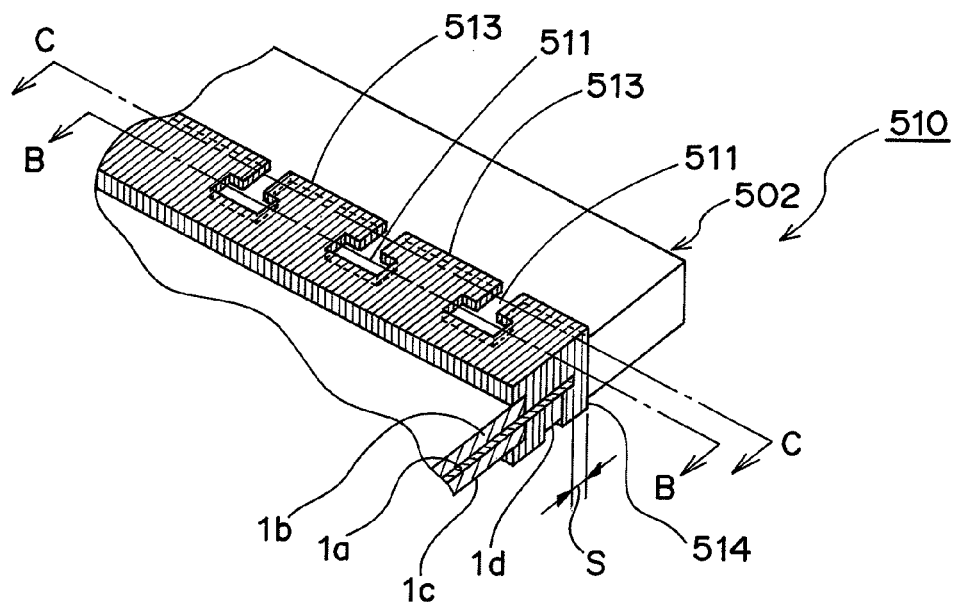
FIG. 18 is a partial schematic perspective view (with elastic members) showing a structure of the electrode-membrane-frame assembly according to the third embodiment of the invention.

Further, as shown in FIG. 18, anode-side elastic members 513 and cathode-side elastic members 514 are placed so as to fill inner spaces of the first recessed portions 511a and the second recessed portions 512a, respectively. In addition, the anode-side elastic members 513 and the cathode-side elastic members 514 are integrally formed so as to be coupled to one another, respectively.

Figure 19A:
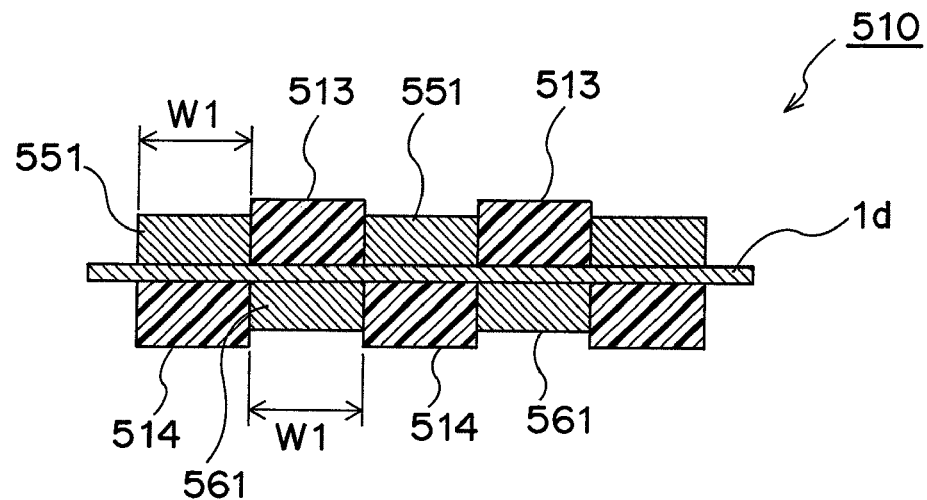
FIG. 19A is a sectional view of the electrode-membrane-frame assembly of the third embodiment taken along the line B-B of FIG. 18.
Figure 19B:
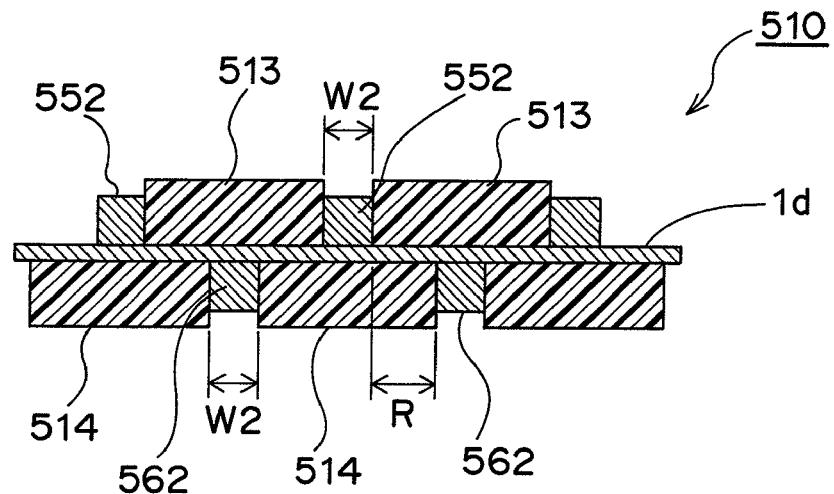
FIG. 19B is a sectional view of the electrode-membrane-frame assembly of the third embodiment taken along the line C-C of FIG. 18.

In this connection, FIG. 19A shows a sectional view of the electrode-membrane-frame assembly 510 taken along the line B-B of FIG. 18, and FIG. 19B shows a sectional view taken along the line C-C. That is, FIG. 19A shows a cross section corresponding to formation positions of the projective end portions 551 of the first retaining portions 511, and FIG. 19B shows a cross section corresponding to formation positions of the coupling portions 552 of the first retaining portions 511.

As shown in FIGS. 19A and 19B, the width (projective-end side width) W1 of the projective end portions 551 of the first retaining portions 511 is larger than the width (frame-body-main-part side width) W2 of the coupling portions 552. This relationship of width applies also between projective end portions 561 and coupling portions 562 of the second retaining portions 512. Also, as shown in FIG. 19A, end portions of the projective end portions 551 of the first retaining portions 511 and end portions of the projective end portions 561 of the second retaining portions 512 are placed so as to be generally coincident with each other, respectively, with their projective end portions 551 and projective end portions 561 alternately positioned with each other. Further, as shown in FIG. 19B, the anode-side elastic members 513 placed within the first recessed portions 511a, which are positioned between the individual coupling portions 552 of the first retaining portions 511, and the cathode-side elastic members 514 placed within the second recessed portions 512a, which are positioned between the individual coupling portions 562 of the second retaining portions 512, have their mutual overlap regions R.

With such a placement structure adopted, larger areas for placement of the elastic members 513, 514 near outer-end edges in the peripheral edge portion 1d of the polyelectrolyte membrane 1a can be ensured. Accordingly, the effect for sealing the communications between the front-and-back surfaces of the polyelectrolyte membrane 1a can be enhanced, so that the occurrence of the crossleak phenomenon can be suppressed effectively.

Also, in the manufacturing process of the electrode-membrane-frame assembly 510, lager areas for pressing and retaining the peripheral edge portion 1d of the polyelectrolyte membrane 1a by the mold can be ensured during the molding of the frame body 502. Accordingly, the peripheral edge portion 1d of the polyelectrolyte membrane 1a can more securely be prevented from being floated up or peeled up during the molding of the frame body 502. From such a viewpoint, the structure of this third embodiment is effective particularly for cases in which the polyelectrolyte membrane 1a has low-strength specifications.

Furthermore, as shown in FIG. 18, in the structure of the third embodiment, a space S is provided between the outer end face of the peripheral edge portion 1d of the polyelectrolyte membrane 1a and the inner edge of the frame body main part 503. This space S is set to, for example, about 0.4 mm. By providing the space S like this, the outer end face of the peripheral edge portion 1d of the polyelectrolyte membrane 1a can be prevented from making contact with the high-temperature flowing resin during the molding of the frame body 502. Since the outer end face portion of the polyelectrolyte membrane 1a, in particular, is more liable to damage under high-temperature or high-pressure environments, the effect for suppressing deformation of the polyelectrolyte membrane 1a due to its being floated up or peeled up during the molding of the frame body 502 can be enhanced. Besides, such an arrangement with the space S provided is not limited to the third embodiment only, but also applicable to the structures of the foregoing individual embodiments.

In addition, in the structure of the electrode-membrane-frame assembly 510 of the third embodiment, the width W1 of each projective end portion 551 of the first retaining portions 511 and each projective end portion 561 of the second retaining portions 512 is preferably set to, for example, within a range of 1 mm to 15 mm. The reason of this is that too smaller widths W1 would lead to filling failures of resin material in molded products as well as to cost increases in mold machining. Conversely, too larger widths W1 would result in a lowered pressing effect, i.e. lowered sealing effect, for the polyelectrolyte membrane 1a by the elastic members 513, 514.

Also, a depth D of the retaining portions 511, 512 is preferably set to within a range of 1 mm to 8 mm in terms of practical use. The reason of this is that too smaller depths D1 would result in a lowered pressing effect for the polyelectrolyte membrane 1a, while too larger depths D1 would lead to increases in useless areas in the peripheral edge portion 1d of the polyelectrolyte membrane 1a.

Further, the width W2 of each coupling portion 552 of the first retaining portions 511 and each coupling portion 562 of the second retaining portions 512 is preferably set to, for example, within a range of 1 mm to 10 mm. The reason of this is that too larger widths W2 would result in a lowered pressing effect, i.e. lowered sealing effect, for the polyelectrolyte membrane 1a by the elastic members 513, 514. Conversely, too smaller widths W2 might lead to filling failures of resin material in molded products.

Furthermore, a width W3 of each projective end portion 551 of the first retaining portions 511 and each projective end portion 561 of the second retaining portions 512 in a direction along inner and outer edges of the frame body 502 is preferably set to, for example, within a range of 1 mm to 5 mm. The reason of this is that too larger widths W3 would result in a lowered pressing effect, i.e. lowered sealing effect, for the polyelectrolyte membrane 1a by the elastic members 513, 514. Conversely, too smaller widths W3 might lead to filling failures of resin material in molded products.

This third embodiment has been described, as an example, about the electrode-membrane-frame assembly 510 including the retaining portions 511 and 512 each of which is formed into such a generally T shape that its inner-edge side width is larger than its outer-edge side width in the direction along the inner and outer edges of the frame body 502 (i.e., a direction perpendicular to the peripheral edge portion 1d of the polyelectrolyte membrane 1a). However, the structure of the third embodiment is not limited to such a structure only.

Figure 20:
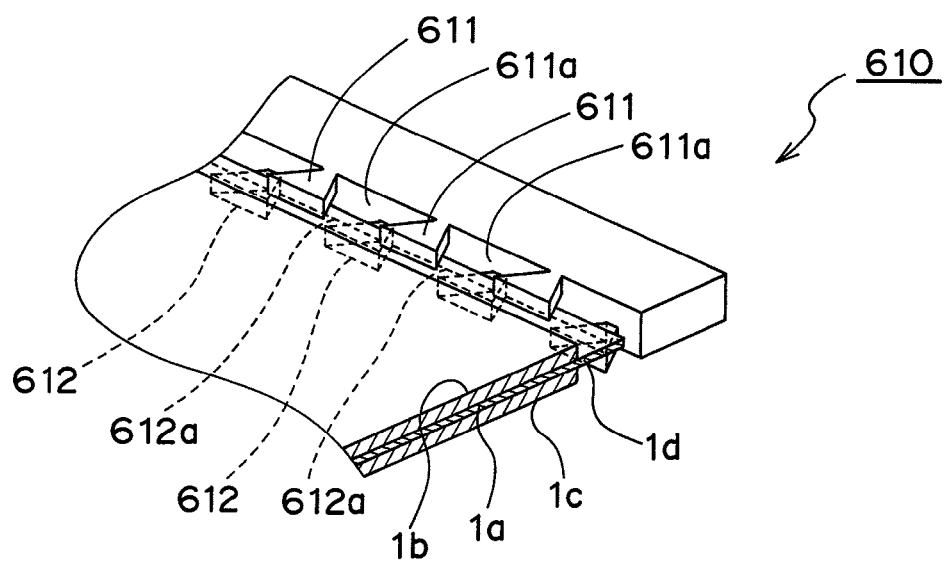
FIG. 20 is a partial schematic perspective view (with no elastic members) showing a structure of an electrode-membrane-frame assembly according to a modification of the third embodiment of the invention.
Figure 21:
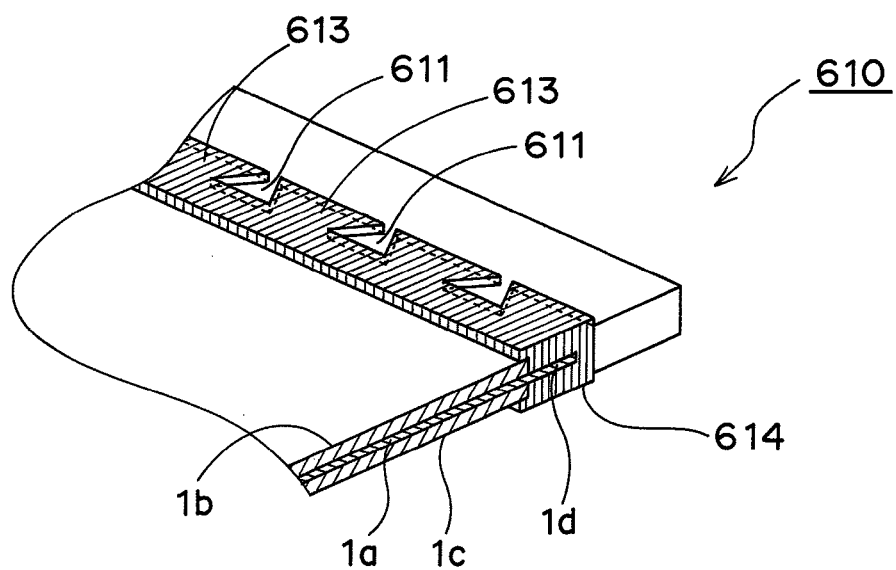
FIG. 21 is a partial schematic perspective view (with elastic members) showing a structure of an electrode-membrane-frame assembly according to a modification of the third embodiment of the invention.

Instead of such a case, for instance, a structure having generally trapezoidal-shaped retaining portions, in each of which its longer side is placed closer to the center of the frame body, such as in an electrode-membrane-frame assembly 610 shown in FIGS. 20 and 21, may also be adopted.

More specifically, as shown in FIG. 20, first retaining portions 611 are each formed into a right-and-left symmetrical trapezoidal shape which is longer in its projective end side, while second retaining portions 612 are also each formed into the same shape as the first retaining portions 611. The first retaining portions 611 and the second retaining portions 612 are arrayed at a uniform interval pitch so that the first retaining portions 611 and the second retaining portions 612 are alternately positioned with each other. Between neighboring first retaining portions 611 are placed first recessed portions 611a each having an inverted-trapezoidal shape in comparison to the first retaining portions 611. Similarly, second recessed portions 612a each having an inverted-trapezoidal shape are also placed between neighboring second retaining portions 612.

Further, as shown in FIG. 20, anode-side elastic members 613 and cathode-side elastic members 614 are placed so as to fill inner spaces of the first recessed portions 611a and the second recessed portions 612a, respectively. In addition, the anode-side elastic members 613 and the cathode-side elastic members 614 are integrally formed so as to be coupled to one another, respectively.

With such a structure of the electrode-membrane-frame assembly 610 according to the modification of the third embodiment, effects generally similar to those of the electrode-membrane-frame assembly 510 as described above can be obtained. The structure of the electrode-membrane-frame assembly 610 according to the modification is slightly superior to the electrode-membrane-frame assembly 510 in terms of the fluidity of resin to the retaining portions 611 and 612, but the electrode-membrane-frame assembly 510 is better in terms of mold machinability. Thus, which structure to adopt is preferably determined by taking into consideration specifications of the resin material to be used, mold machinability and the like.

It is also allowable to adopt a structure that a sloped surface is provided at each end portion of the retaining portions in the thicknesswise direction of the frame body in the foregoing individual embodiments. Depending on the direction of the sloped surface, fittability between the retaining portions and the elastic members in the thicknesswise direction can be improved.

Also, the foregoing individual embodiments have been described on cases where the first retaining portions are placed at a constant interval pitch and the second retaining portions are also placed at a constant interval pitch. However, the placement intervals may also be inconstant. Even in such cases, it is preferable that the second retaining portions be placed so as to be alternately positioned with the first retaining portions to such an extent that the overlap regions R are formed between the placement regions of the anode-side elastic members and the placement regions of the cathode-side elastic members.

It is to be noted that, by properly combining the arbitrary embodiments of the aforementioned various embodiments, the effects possessed by them can be produced.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The entire disclosure of Japanese Patent Application No. 2007-266566 filed on Oct. 12, 2007, including specification, claims, and drawings are incorporated herein by reference in its entirety.

The invention claimed is:

1. An electrode-membrane-frame assembly for polyelectrolyte fuel cells, comprising:
   a membrane-electrode assembly comprising: a polyelectrolyte membrane having a front surface, and a back surface; and a pair of electrode layers placed on portions of the front and back surfaces, respectively, of the polyelectrolyte membrane inner than a peripheral edge portion of the polyelectrolyte membrane;
   a frame body which retains the peripheral edge portion of the polyelectrolyte membrane, the frame body being formed from resin; and
   a plurality of elastic members for sealing communications between a front surface side and a back surface side of the membrane-electrode assembly in a peripheral edge portion of the membrane-electrode assembly, wherein
   the frame body comprises:
      a frame body main part placed along the peripheral edge portion of the polyelectrolyte membrane;
      a plurality of first retaining portions which protrude from an inner edge of the frame body main part toward a center of the frame body and which are arrayed along the inner edge of the frame body main part and which retain the front surface of the polyelectrolyte membrane; and a plurality of second retaining portions which protrude from the inner edge of the frame body main part toward the center of the frame body and which are arrayed along the inner edge of the frame body main part and which retain the back surface of the polyelectrolyte membrane, and wherein the first retaining portions and the second retaining portions are so arrayed that retaining positions of the polyelectrolyte membrane by the first retaining portions and retaining positions of the polyelectrolyte membrane by the second retaining portions are alternately placed along the peripheral edge portion of the polyelectrolyte membrane, and the plurality of elastic members includes a plurality of front-surface side elastic members placed on the front surface of the polyelectrolyte membrane directly between adjacent ones of the first retaining portions, and a plurality of back-surface side elastic members placed on the back surface of the polyelectrolyte membrane directly between adjacent ones of the second retaining portions.

2. The electrode-membrane-frame assembly for polyelectrolyte fuel cells as defined in claim 1, wherein the front-surface side elastic members and the back-surface side elastic members are each formed so as to be upheaved upper than a separator-side surface of the frame body.

3. The electrode-membrane-frame assembly for polyelectrolyte fuel cells as defined in claim 1, wherein the front-surface side elastic members and the back-surface side elastic members are placed on the front surface and the back surface, respectively, of the polyelectrolyte membrane so as to extend from the inner edge of the frame body main part to outer edges of the electrode layers, respectively.

4. The electrode-membrane-frame assembly for polyelectrolyte fuel cells as defined in claim 3, wherein neighboring ones of the front-surface side elastic members are so formed as to be coupled to one another, and neighboring ones of the back-surface side elastic members are so formed as to be coupled to one another.

5. The electrode-membrane-frame assembly for polyelectrolyte fuel cells as defined in claim 1, wherein one of the back-surface side elastic members placed opposite to the first retaining portions, and one of the front-surface side elastic members placed opposite to the second retaining portions neighboring the one of the back-surface side elastic members, have an overlap region in part of their respective placement regions onto the polyelectrolyte membrane in the peripheral edge portion of the polyelectrolyte membrane.

6. The electrode-membrane-frame assembly for polyelectrolyte fuel cells as defined in claim 1, wherein the first retaining portions and the second retaining portions are so formed that a width of each of the retaining portions on its projective end side projecting toward the center of the frame body is larger than a width of each of the retaining portions on its frame body main part side.

7. The electrode-membrane-frame assembly for polyelectrolyte fuel cells as defined in claim 1, wherein a space is provided between the inner edge of the frame body main part and an end face of the peripheral edge portion of the polyelectrolyte membrane.

8. A polyelectrolyte fuel cell which comprises, in one layer or a plurality of stacked layers, an electric cell module having the electrode-membrane-frame assembly as defined in claim 1, and a pair of separators which are so placed as to sandwich the electrode-membrane-frame assembly.

9. A method for manufacturing an electrode-membrane-frame assembly for polyelectrolyte fuel cells, comprising:

in such an arrangement of a membrane-electrode assembly in a mold for injection molding that the membrane-electrode assembly is supported from its front surface side by a plurality of first support portions placed along a peripheral edge portion of the membrane-electrode assembly while the membrane-electrode assembly is supported from its back surface side by a plurality of second support portions which are placed along the peripheral edge portion of the membrane-electrode assembly so as to be alternately positioned with the plurality of first support portions along the peripheral edge portion, forming a frame-shaped flow passage placed in a frame shape along the peripheral edge portion of the membrane-electrode assembly, a first flow passage which is communicated with the frame-shaped flow passage and which is placed so as to be in contact with a front surface in the peripheral edge portion of the membrane-electrode assembly between neighboring ones of the first support portions, and a second flow passage which is communicated with the frame-shaped flow passage and which is placed so as to be in contact with a back surface in the peripheral edge portion of the membrane-electrode assembly between neighboring ones of the second support portions;

injecting and filling resin into the flow passages in a state that the peripheral edge portion of the membrane-electrode assembly is retained by the first support portions and the second support portions, respectively;

solidifying the filled resin thereby forming a frame body including: a frame body main part formed by the frame-shaped flow passage; a plurality of first retaining portions which are arrayed along an inner edge of the frame body main part in the first flow passage so as to protrude from the inner edge toward a center of the frame body and which serve for retaining the front-surface side of the membrane-electrode assembly; and a plurality of second retaining portions which are arrayed along the inner edge of the frame body main part in the second flow passage so as to protrude from the inner edge toward the center of the frame body and which serve for retaining the back-surface side of the membrane-electrode assembly; and forming a plurality of front-surface side elastic members which are placed on the front surface of the membrane-electrode assembly directly between adjacent ones of the first retaining portions, and a plurality of back-surface side elastic members which are placed on the back surface of the membrane-electrode assembly directly between adjacent ones of the second retaining portions.

* * * * *